US005425084A

United States Patent [19]
Brinskele

[11] Patent Number: 5,425,084
[45] Date of Patent: Jun. 13, 1995

[54] COMPUTER-CONTROLLED TELECOMMUNICATIONS SYSTEM

[76] Inventor: Edward A. Brinskele, 12200 Pt. Reyes Petaluma Rd., Nicasio, Calif. 94946

[21] Appl. No.: 979,940

[22] Filed: Nov. 23, 1992

[51] Int. Cl.⁶ .......................................... H04M 15/00
[52] U.S. Cl. ................................... 379/112; 379/111; 379/113; 379/114; 379/115; 379/116; 379/121; 379/125
[58] Field of Search ............... 379/111, 112, 114, 115, 379/116, 121, 125, 126

[56] References Cited

U.S. PATENT DOCUMENTS

| | | | |
|---|---|---|---|
| 4,122,308 | 10/1978 | Weinberger et al. | 379/114 |
| 4,139,739 | 2/1979 | von Meister | 179/18 B |
| 4,348,554 | 9/1982 | Asmuth | 379/113 |
| 4,410,765 | 10/1983 | Hestad et al. | 379/112 |
| 4,585,904 | 4/1986 | Mincone et al. | 379/112 |
| 4,611,096 | 9/1986 | Asmuth et al. | 379/111 |
| 4,757,267 | 7/1988 | Riskin | 379/113 |
| 4,813,065 | 3/1989 | Segala | 379/112 |
| 4,972,464 | 11/1990 | Webb et al. | 379/112 |
| 5,027,387 | 6/1991 | Moll | 379/115 |
| 5,136,633 | 8/1992 | Tejada et al. | . |
| 5,136,636 | 8/1992 | Wegrzynowicz | 379/127 |
| 5,163,042 | 11/1992 | Ochiai | 379/112 |

FOREIGN PATENT DOCUMENTS

WO92/01350 1/1992 WIPO .
WO93/16544 8/1993 WIPO .

Primary Examiner—Stephen Chin
Assistant Examiner—Vijay Shankar
Attorney, Agent, or Firm—Finnegan, Henderson, Farabow, Garrett & Dunner

[57] ABSTRACT

A method and apparatus for providing the lowest available telecommunications charge to a user is described. The lowest available charge is provided by locating switches in different telecommunications charge zones, determining which switch will provide the lowest available charge at a selected time, and using that switch to place calls to a transmitter device and a receiver device so that information signals can be transmitted between the devices.

66 Claims, 24 Drawing Sheets

CREDIT MODULE 1900

| | | |
|---|---|---|
| FIRST POTENTIAL USER | ACCOUNT NUMBER | CURRENT CREDIT CARD NUMBER — 1902 |
| | | CREDIT CARD EXPIRATION DATE — 1903 |
| | | CURRENT BILLING ADDRESS — 1904 |
| | | HISTORY OF REVENUE — 1905 |
| | | CURRENT AUTHORIZATION CODE — 1906 |
| | | CREDIT LINE — 1907 |
| | | CHARGES PENDING AGAINST CURRENT AUTH. CODE — 1908 |
| | | DATE OF LAST CHARGE — 1909 |
| | | NEW AUTHORIZATION CODE — 1910 |
| | | COUSTOMER STATUS (Y/N) — 1911 |

SUB-MODULE OF TZONE MODULE 2500

| | | | | |
|---|---|---|---|---|
| | | | MCI | MCI CHARGE |
| | | STANDARD | AT&T | AT&T CHARGE |
| | | | SPRINT | SPRINT CHARGE |
| | | | MCI | MCI CHARGE |
| | HONOLULU (808) | DISCOUNT | AT&T | AT&T CHARGE |
| | | | SPRINT | SPRINT CHARGE |
| | | | MCI | MCI CHARGE |
| | | ECONOMY | AT&T | AT&T CHARGE |
| U.S.A. (1) | | | SPRINT | SPRINT CHARGE |
| | | | MCI | MCI CHARGE |
| | | STANDARD | AT&T | AT&T CHARGE |
| | | | SPRINT | SPRINT CHARGE |
| | SAN FRANCISCO (415) | | MCI | MCI CHARGE |
| | | DISCOUNT | AT&T | AT&T CHARGE |
| | | | SPRINT | SPRINT CHARGE |
| | | | MCI | MCI CHARGE |
| | | ECONOMY | AT&T | AT&T CHARGE |
| | | | SPRINT | SPRINT CHARGE |

COMPUTER-CONTROLLED TELECOMMUNICATIONS SYSTEM

I. BACKGROUND OF THE INVENTION

A. Field of the Invention

The present invention relates to a computer-controlled telecommunications system and, in particular, to control circuitry for establishing an optimum communications link between a transmitter device and a receiver device.

B. Description of the Related Art

Recent advances in technology have resulted in unprecedented growth and diversification in the field of telecommunications. Telecommunications systems, long used for transmitting voice signals between telephones, are now being implemented in a wide variety of other applications. Such applications include, for example, the transfer of information between local area networks (LANs) and the transmission of documents via facsimile. The wide variety of available telecommunications applications has resulted in a marked increase in the use of telecommunications systems.

Telecommunications system use has also increased as a result of the greater number of telephone devices now available. With the advent of devices such as portable and cellular telephones, more people spend a greater amount of time in telephonic communication than in the past.

These factors have contributed to a general increase in the use of telecommunications systems and, in particular, to an increase in the use of telecommunications systems for sending long distance and international transmissions. The dramatic social and economic changes which the world has undergone in the past several years have also resulted in the increased use of long distance and international telecommunications systems. The current socioeconomic climate of the world suggests that the number of long distance and international transmissions will continue to grow at an increased rate.

The major drawback associated with long distance and international telecommunications system use is cost. Each time a long distance or international telephone call is made, a charge is imposed by a telecommunications carrier such as MCI or AT&T. The amount of the charge depends on (1) the telecommunications carrier used, (2) the time of the call, and (3) the telecommunications charge zone from which the call originated. In general, telecommunications charges for a given charge zone are highest during the day (standard charges), somewhat lower in the early evening (discount charges), and lowest during the late evening and early morning hours (economy charges).

Various systems have been proposed to reduce the cost of long distance telephone calls. One of these systems is depicted in FIG. 1.

The system of FIG. 1 includes a telephone 1 which a user such as a person may use for making long distance telephone calls to a receiver telephone 2. Telephone 1 is coupled to a dialer box 3 owned by an operating company. The dialer box is used to dial the telephone number of a card 4 owned by the same operating company that owns the dialer box. Dialer box 3 dials the telephone number of the card 4 each time the user dials a long distance telephone number into telephone 1.

The user of telephone 1 rents the dialer box 3 and the card 4 from the operating company. Dialer box 3 and telephone 1 are located in a facility outside of the United States. Card 4 is located within the United States.

To place a call to the receiver telephone 2, the user places telephone 1 in the "off hook" state and then dials the telephone number of the receiver telephone. Telephone 1 provides the telephone number of the receiver telephone to dialer box 3 which, in response, dials the number of the card 4. Card 4 then returns a signal to telephone 1, at which time the user places telephone 1 in the "on hook" state and waits for a call from the card.

Card 4 then dials the number of telephone 1, causing telephone 1 to ring. When telephone 1 rings, the user again places telephone 1 in the "off hook" state, thereby establishing a transmitter communications path between card 4 and telephone 1.

Next, card 4 dials the telephone number of receiver telephone 2, causing the receiver telephone to ring. When receiver telephone 2 is placed in the "off hook" state, a receiver communications path is established between the card 4 and the receiver telephone.

Card 4 then establishes a communications link between telephone 1 and receiver telephone 2 through the transmitter and receiver communications paths, which allows the transmission of voice signals between such telephones. Because the communications link is established by card 4 rather than by telephone 1, the telecommunications charge incurred by the user is associated with the charge zone of the card instead of the charge zone of telephone 1.

Another approach to reducing long distance charges is shown in FIG. 2. The system of FIG. 2 includes a telephone 5 coupled to a digital switch 6 which comprises a line card 7, a dedicated trunk card 8, and central processing unit (CPU) 9 having an associated memory unit 10. Line card 7 has several line ports 11 for coupling to telephone lines. Trunk card 8 has several trunk ports 12 which are each coupled to a telephone line owned by a common carrier such as MCI or AT&T.

When a user at telephone 5 wishes to place a call to a receiver telephone (not shown), the user places telephone 5 in the "off hook" state and dials the number of the receiver telephone. The call from telephone 5 is received by digital switch 6 through one of line ports 11. Digital switch 6 then routes the call to the receiver device through a selected trunk port 12 using the telecommunications carrier telephone line coupled to that trunk port.

The system of FIG. 2 performs a least cost routing (LCR) function. The LCR function determines which telecommunications carrier telephone line, if used, will result in the lowest telecommunications charge. The LCR function then selects the trunk port which is coupled to that line for use as the trunk port for routing the call to the receiver device. If the selected trunk port is available, the call is routed to the receiver device from the selected trunk port. If the selected trunk port is unavailable, the LCR function is repeated until an available trunk port is selected.

The systems of FIGS. 1 and 2 are deficient for a variety of reasons. The system of FIG. 1, for example, only accepts calls from outside of the United States. As a result, users within the United States cannot use such a system to reduce long distance or international transmission charges. Moreover, the system of FIG. 1 requires the rental of the dialer box 3 and card 4 at a rate of approximately two hundred dollars per month. Also, this system is subject to both level matching and line balancing problems.

In addition, the system of FIG. 1 is a proprietary hardware-based system which only accepts calls from those user telephones that are connected to dialer boxes. As a result, users of this system are severely limited in the options available for accessing the system. Each user can only access the system using the telephone coupled to that user's dialer box. If a user is not near a telephone that has already been connected to a dialer box, then that user cannot access the system.

Furthermore, the hardware-based nature of the system of FIG. 1 limits its flexibility and utility. The basic function performed by card 4 is to establish a communications link between the telephone 1 and receiver telephone 2. Card 4 cannot be programmed or controlled to perform other useful functions such denying access to a user when that user's credit status is unsatisfactory, or determining whether placement of a call through the card will actually result in decreased charges for the user.

An additional shortcoming of the system of FIG. 1 is that users always incur a telecommunications charge associated with the telecommunications charge zone in which the card 4 is located. More often than not, this charge is not the lowest telecommunications charge available. Numerous other telecommunications charge zones may have lower charges, but the system of FIG. 1 does not recognize or take advantage of these lower charges.

In addition, when the telecommunications charge associated with the charge zone in which the card 4 is located is higher than the telecommunications charge associated with the charge zone in which telephone 1 is located, the system of FIG. 1 cannot even be used without causing a higher charge than if a direct call were placed from telephone 1 to receiver telephone 2, which is a severe and costly limitation associated with the system of FIG. 1.

Like the system of FIG. 1, the system of FIG. 2 does not recognize or take advantage of the fact that at various times throughout each day, different telecommunications charge zones provide lower available charges. The system of FIG. 2 is merely an intra-switch mechanism which compares charges imposed by various telecommunications carriers to select one of the carriers. The system of FIG. 2 does not reduce costs by establishing communications links using switches located in different telecommunications charge zones. In the system of FIG. 2, communications links between telephone 5 and the receiver telephone are always established in the telecommunications charge zone in which digital switch 6 is located.

II. SUMMARY OF THE INVENTION

Accordingly, it is a goal of the present invention to provide an apparatus and method for establishing an optimum communications link between a transmitter device and a receiver device regardless of the time of day or location of the user.

Another goal of the present invention is to provide an apparatus and method for establishing a communications link between a transmitter device and a receiver device that will result in the lowest available charge being imposed by a telecommunications carrier for the transmission of telecommunications signals between the transmitter and receiver devices.

Yet another goal of the present invention is to provide an apparatus and method for outputting a control signal to a switch located in a selected telecommunications charge zone to cause the switch to establish the communications link which will result in the lowest available charge being imposed by a telecommunications carrier.

These and other goals may be achieved by using a computer-controlled telecommunications system that determines which of a plurality of communications links associated with a charge imposed by a telecommunications carrier has the lowest charge at a selected time, and then outputs a control signal to a selected switch to cause it to establish a communications link corresponding to the lowest determined charge.

In particular, the foregoing goals may be achieved by a computer-controlled telecommunications system for establishing an optimum communications link between a transmitter device and a receiver device, the system comprising: a plurality of switch means each for establishing, in response to a switch control signal, a communications link between the transmitter device and the receiver device, each of the communications links being associated with a charge imposed by a telecommunications carrier, and each of the switch means being located in a different telecommunications charge zone; and switch control means, coupled to the plurality of switch means, for determining which of the charges for the communications links is lowest at a selected time, and for generating and outputting the switch control signal to a selected one of the switch means to cause that switch means to establish the one of the communications links corresponding to the lowest determined charge.

A method according to this invention is performed by a computer-controlled telecommunications system comprising a switch control device and a plurality of switches each for establishing, in response to a switch control signal, a communications link between a transmitter device and a receiver device, each of the communications links being associated with a charge imposed by a telecommunications carrier, and each of the switches being located in a different telecommunications charge zone, the method comprising the steps of: determining which of the charges for the communications links is lowest at a selected time; and generating and outputting the switch control signal to a selected one of the switches to cause that switch to establish the one of the communications links corresponding to the lowest determined charge.

It is to be understood that both the foregoing general description and the following detailed description are exemplary and explanatory, and are not restrictive of the invention as claimed. The accompanying drawings, which are incorporated in and constitute a part of the specification, illustrate embodiments of the present invention and together with the general description, serve to explain the principles of the present invention.

III. BRIEF DESCRIPTION OF THE DRAWINGS

FIG. 19 is a portion of a look-up table associated with another data base module which may be stored in the file server which forms a part of the file server network shown in FIG. 11.

FIG. 25 is a portion of a look-up table associated with a sub-module of a data base module which may be stored in the file server which forms a part of the file server network shown in FIG. 11.

IV. DESCRIPTION OF THE PREFERRED EMBODIMENTS

A. General Description

The present invention relates to a computer-controlled telecommunications system including a plurality of digital switches each located in a different telecommunications charge zone. Each of the switches may be used to establish a communications link between a transmitter device and a receiver device. Each communications link is associated with a charge imposed by a telecommunications carrier. A file server in the telecommunications system has a processor for determining which of the charges is lowest at a selected time, and causing a selected one of the digital switches to establish the one of the communications links corresponding to the lowest determined charge.

Figure 3:
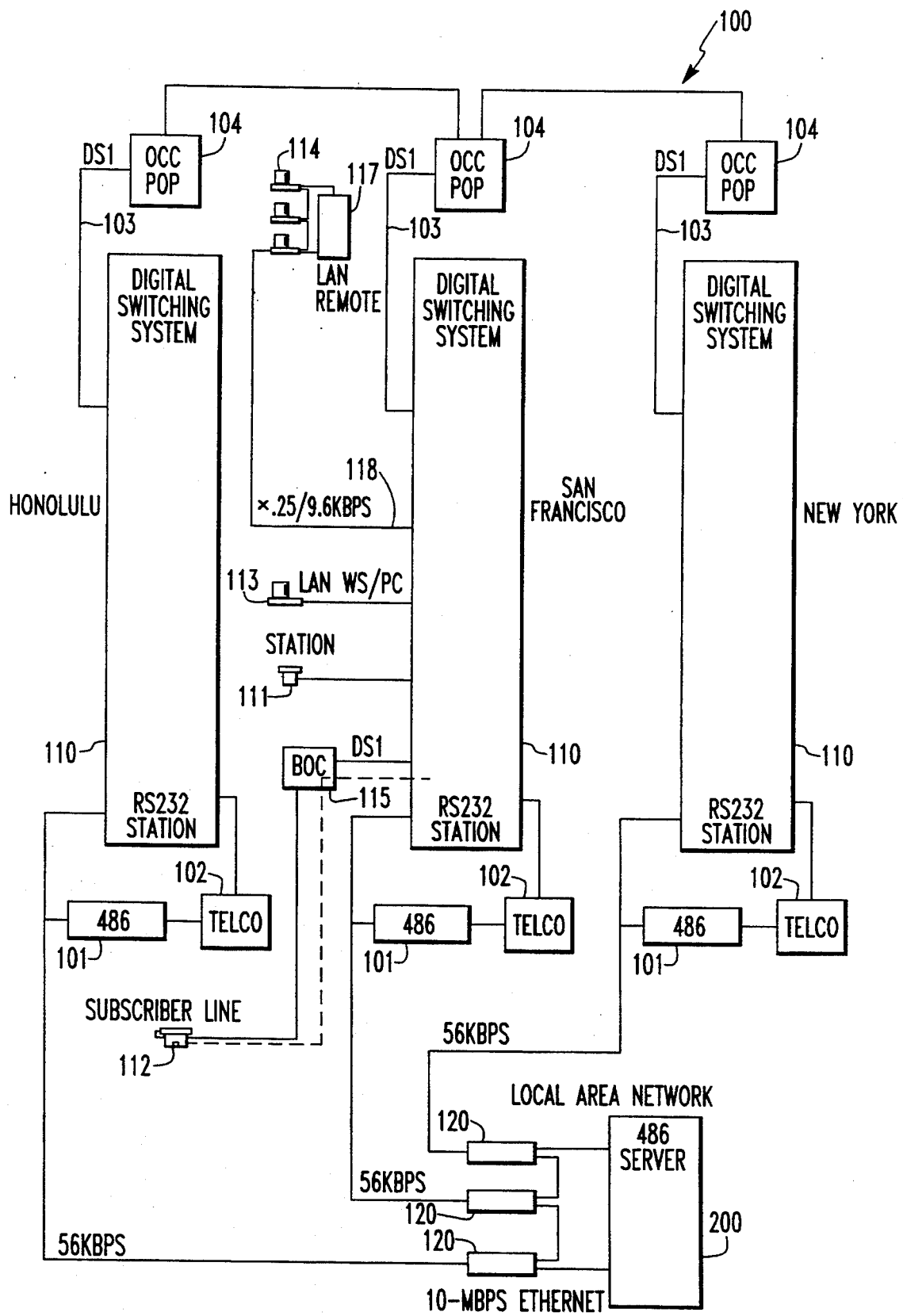
FIG. 3 is a block diagram of a computer-controlled telecommunications system in accordance with an embodiment of the present invention.

FIG. 3 is a block diagram of a computer-controlled telecommunications system 100 constructed in accordance with an embodiment of the present invention. Telecommunications system 100 includes several local workstations 101 each associated with a Bell Operating Company (TELCO) 102, a dedicated access facility 103, a telecommunications carrier point of presence 104, a central office switch 115, a remote server 117, a data line 118, and several workstations 120. These components will be discussed in detail below.

Telecommunications system 100 also includes a plurality of digital switching systems (hereafter "digital switches") 110. Each digital switch 110 may be a PBX (private branch exchange) or other switch suitable for routing telecommunications signals. In a preferred embodiment, each digital switch 110 is a Harris 2020 Voice Frame manufactured by the Harris Corporation of Melbourne, Fla.

When a digital switch 110 connects to a telephone line owned by a telecommunications carrier, such as MCI or AT&T, the carrier imposes a charge which is commonly measured in units of dollars per minute. The charge depends on the telecommunications charge zone in which that switch is located. In FIG. 3, for example, one digital switch 110 is located in Honolulu, Hi.; another digital switch 110 is located in San Francisco, Calif.; and a third digital switch 110 is located in New York City, N.Y. Each of these three cities is located in a different telecommunications charge zone. Accordingly, depending on the time of day, each digital switch 110 may be associated with a different telecommunications charge.

Telecommunications system 100 also includes one or more transmitter devices coupled to a digital switch which functions as an "initiating switch." In FIG. 3, the initiating switch is the digital switch 110 located in San Francisco, Calif. However, any digital switch capable of generating a message service request (for example, the digital switch 110 located Honolulu or the digital switch 110 located in New York City) may be coupled to the transmitter devices to perform the initiating switch function.

Examples of the transmitter devices may include, for example, an office telephone station 111, a home telephone subscriber line 112, a LAN (local area network) workstation 113, or a remote LAN workstation 114. A selected one of the transmitter devices is used to transmit telecommunications signals (e.g., voice or other information signals) to a receiver device (not shown), such as a telephone or other device capable of receiving telecommunications signals. The selected transmitter device may also receive telecommunications signals transmitted by the receiver device.

The telecommunications signals are transmitted between the selected transmitter device and the receiver device through a communications link established by one of the digital switches 110. The digital switch 110 which is used to establish the communications link will be referred to hereafter as the "originating switch."

The communications link is a signal path which runs between the selected transmitter device and the receiver device and includes a transmitter communications path and a receiver communications path. The transmitter communications path runs between the originating switch and the selected transmitter device, and the receiver communications path runs between the originating switch and the receiver device. The transmitter communications path and the receiver communications path are coupled to one another at the originating switch to form the communications link.

Each digital switch 110 is coupled to a file server 200. In a preferred embodiment, file server 200 is a microcomputer including an Intel 486 microprocessor manufactured by the Intel Corporation of Santa Clara, Calif. File server 200 determines which digital switch 110 will be used as the originating switch. File server 200 makes this determination in response to receipt of a message service request known as a "call record" (discussed in detail below) output by the initiating switch. Under certain circumstances, the initiating switch will also function as the originating switch.

The originating switch establishes a communications link between the selected transmitter device and the receiver device. The establishment of the communications link allows the transmission of information signals between the selected transmitter device and the receiver device. Since the originating switch is the switch which establishes the communications link, the charge imposed by the telecommunications carrier for the transmission of information signals on the communications link will be a charge associated with the originating switch. File server 200 ensures that the charge associated with the originating switch will always be the lowest telecommunications charge available.

B. Transmitter and Receiver Devices

FIGS. 4 through 8 show examples of various types of devices which may be used as the selected transmitter device or the selected receiver device. The selected transmitter device and the receiver device may be any device capable of transmitting or receiving telecommunications signals, respectively, (such as facsimile machines, telex machines, and the like), and therefore are not limited to the examples shown in FIGS. 4 through 8.

The types of telecommunications signals which may be transmitted and received depend on the nature of the transmitter and receiver devices used. Since telecommunications system 100 may be used to transmit electronic mail, voice messaging data, and network facsimile data, and to transfer information such as data files and OCR libraries, all types of transmitter and receiver devices capable of transmitting and receiving such data are appropriate for use in connection with the telecommunications system. Using telecommunications system 100, data and message service requests may be transmitted between and over network signalling sources such as X.25 (packet switching), SS7 (system signalling 7), DDS (digital data service), Ethernet, or other viable information network transmission signaling standards.

A description of the transmitter devices shown in FIGS. 4 through 8 is set forth in the following sections. It is emphasized that the transmitter devices shown in FIGS. 4 through 8 are merely examples of the types of transmitter devices which are suitable for use in connection with the present invention, and that other types of transmitter devices may be used.

1. The Telephone Station

Figure 4:
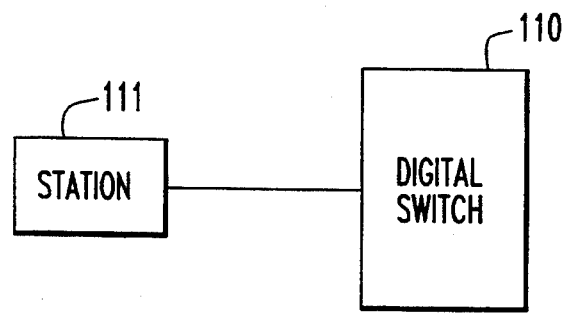
FIG. 4 is a block diagram showing a telephone station coupled to an initiating digital switch within the telecommunications system of FIG. 3.

FIG. 4 shows a telephone station 111 coupled to a digital switch 110 functioning as the initiating switch. Telephone station 111 may be selected by the user for use as the selected transmitter device.

A station is a telephone coupled to a private switch such as a PBX (private branch exchange). The private switch may be associated with a business office having several telephone stations. In general, all of the telephone stations in a given business office will be coupled to the initiating switch 110 through the same PBX.

The user may place telephone station 111 in an "off hook" state by removing the handset of the telephone from its cradle. Similarly, the user may place the telephone station 111 in an "on hook" state by placing the handset of the telephone on the cradle. If telephone station 111 is capable of functioning in a "hands-free" mode, the "off hook" and "off hook" states may be achieved through manipulation of one or more keys on a keyboard or keypad of the telephone station.

An initiation code may be entered by depressing and then releasing keys of the keyboard or keypad of the telephone station. The initiation code may be a number (such as "8" or "72") indicating that the user desires the establishment of a communications link between the telephone station and a long distance or international receiver device. Alternatively, the initiation code may be the long distance or international telephone number of the receiver device.

2. The Telephone Subscriber Line

Figure 5:
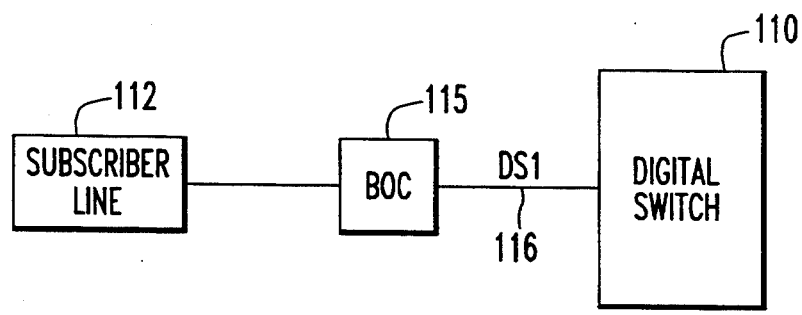
FIG. 5 is a block diagram showing a telephone subscriber line coupled to an initiating digital switch within the telecommunications system of FIG. 3.

FIG. 5 shows a telephone subscriber line 112 coupled through a central office switch 115 and a dedicated access facility (DS1) 116 to a digital switch 110 functioning as the initiating switch. The central office switch 115 is a tandem switch owned by a telecommunications carrier, such as a Bell Operating Company (BOC). The dedicated access facility 116 (also known as a T1 digital facility) comprises a pair of wires over which telecommunications signals pass between the central office switch 115 and the initiating switch. Like telephone station 111, telephone subscriber line 112 may be selected by the user for use as the selected transmitter device.

A subscriber line is a telephone that is coupled to a public switch rather than a private switch such as a PBX. The home telephone is the most common example of a telephone subscriber line.

Like telephone station 111, subscriber line 112 is placed in the "on hook" and "off hook" states either by altering the position of the handset with respect to the telephone cradle, or through manipulation of keys on the keyboard or keypad of the telephone. An initiation code is entered into the subscriber line by depressing and then releasing keys on the keyboard or keypad of the subscriber line. The initiation code for the telephone subscriber line is a seven-digit or ten-digit number which is unique to the user. Since the initiation code for the subscriber line does not identify the telephone number of the receiver device, the receiver telephone number must be entered (e.g., in response to a signal from the initiating switch) at some point in time after entry of the initiation code.

3. The Local Area Network (LAN) Workstation

Figure 6:
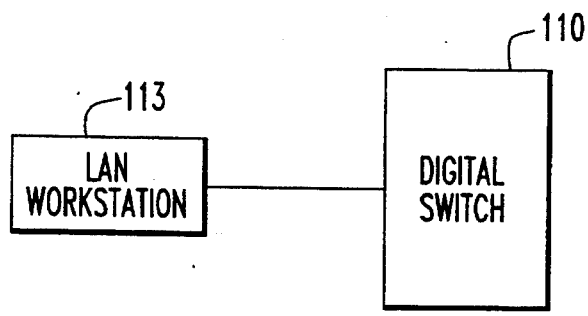
FIG. 6 is a block diagram showing a LAN workstation coupled to an initiating digital switch within the telecommunications system of FIG. 3.

FIG. 6 shows a workstation 113 within a local area network (LAN). Although referred to as a workstation throughout the present application, component 113 of FIG. 6 (also shown in FIG. 3, for example) could of course be replaced by a personal computer as an alternate embodiment.

Workstation 113 is coupled to an initiating switch, such as a digital switch 110 which performs the initiating switch function via a modem in workstation 113 and a station line. Workstation 113 may be selected by the user for use as the selected transmitter device. For example, the user may select workstation 113 to transmit a document or file stored in memory to a receiver device such as a facsimile machine. The "off hook" and "on hook" states are generally not applicable to LAN workstations.

Workstation 113 is preferably located at the same locality as the initiating switch. More particularly, workstation 113 is part of a LAN that is situated in the same location as the initiating switch. The initiating switch is coupled to receive telecommunications signals from workstation 113.

Workstation 113 includes a central processing unit, a memory unit, a display terminal, and input devices such as a keyboard and a mouse. The telephone number of a receiver device may be entered into workstation 113 using a pull-down menu which may be displayed on the display terminal of the workstation.

The pull-down menu includes a set of options that the user can select using the keyboard and/or the mouse. The pull-down menu of workstation 113 may include options such as CALL DIRECTORY, INTERNATIONAL CALL DIRECTORY, or the like.

The user causes the pull-down menu to be displayed by calling a computer program, through manipulation of one or more of the input devices, that displays the menu. The menu display program may be a terminal stay resident (TSR) program that always resides in the memory unit of the workstation 113 or a program that is loaded into the memory unit of the workstation from a hard disk or other external memory location as needed.

When the user desires to forward an electronic mail message or a stored file or document to a receiver device, the user calls for the menu display program to display the pull-down menu on the display terminal of workstation 113. The user then selects one of the options of the pull-down menu. If the user wishes to transmit the data to a local or long distance receiver device, the user selects the CALL DIRECTORY option. If the user desires to transmit the data to an internationally located receiver device, the user selects the INTERNATIONAL CALL DIRECTORY option.

When the CALL DIRECTORY option is selected, the central processing unit causes the display terminal to display a list of telephone numbers of frequently accessed local and long distance receiver devices. Similarly, when the INTERNATIONAL CALL DIRECTORY option is selected, the central processing unit causes the display terminal to display a list of telephone numbers of frequently accessed international receiver devices. The telephone numbers are pre-programmed into the memory unit of workstation 113 by the user. All telephone numbers could be stored under one DIRECTORY name, or under DIRECTORY names other than those listed above. In addition to, or instead of, displaying the telephone numbers of the receiver devices, the name of the entity or user associated with such receiver devices may also be displayed.

Using the input devices of workstation 113, the user scrolls through the displayed telephone numbers until the telephone number of the receiver device to which data is to be sent appears. The user then selects the telephone number of the receiver device using the mouse and/or the keyboard, and depresses and releases the TRANSMIT or ENTER key of the keyboard. The act of depressing and then releasing the TRANSMIT or ENTER key causes the telephone number of the receiver device to be entered into workstation 113 as the number to be output to the initiating one of digital switches 110. The telephone number of the receiver could also be entered by selecting a DIRECT DIAL option from the pull-down menu, manually entering the telephone number of the receiver device into the keyboard, and then depressing and releasing the TRANSMIT or ENTER key.

In response to the entry of the telephone number of the receiver, workstation 113 forwards the telephone number to the initiating switch along with the address of workstation 113. The workstation address may be entered into workstation 113 by the user prior to entry of the receiver telephone number, or workstation 113 may automatically generate and provide the workstation address in response to entry of the receiver telephone number.

When workstation 113 is provided with a ring signal from the originating switch, the workstation signals receipt of the ring signal by providing an indication on the display terminal and/or emitting an audio tone. The user answers the call from the originating switch by depressing and then releasing an answer key on the keypad or keyboard of workstation 113.

Workstation 113 may be modified to include a "soft phone" card which allows audio signals, such as voice signals, to be transmitted from and received by the workstation 113. Those skilled in the art will be able to make and use the soft phone card of workstation 113 in light of the description contained in the present application.

The soft phone card that is installed into workstation 113 includes an RJ11 telephone jack. After installation of the soft phone card, a telephone headset is plugged into the jack. The headset includes a microphone for transmitting audio signals and an earpiece for receiving audio signals.

In operation, the user enters the telephone number of a receiver telephone using the keypad or keyboard of workstation 113 in the manner described above. When the originating switch outputs a ring signal to workstation 113, the display terminal of the workstation indicates that a call is being placed from the originating switch to workstation 113. The user receives the call by depressing and then releasing an answer key on the keyboard or keypad of the workstation, thereby establishing a transmitter communications path between the originating switch and workstation 113. After the originating switch establishes a receiver communications path between the originating switch and the receiver device, the user can carry on a telephone conversation with the receiver device using the telephone headset plugged into the telephone jack of the soft phone card.

Workstation 113 may also be modified to include a headset interface connecting workstation 113 with a telephone preferably located at the same locality as the workstation. In accordance with the headset interface modification, the user enters the telephone number of a receiver telephone using the keypad or keyboard of workstation 113 in the manner described above. After the originating switch outputs a ring signal to workstation 113, the display terminal of the workstation indicates that a call is being placed from the originating switch to workstation 113. Simultaneously, the originating switch may output the ring signal to the telephone located at the same locality as the workstation 113, causing that telephone to ring.

In response to the ring signal output by the originating switch, the user depresses and then releases an answer key on the keyboard or keypad of workstation 113. Such action by the user causes workstation 113 to output a signal via the headset interface to the telephone located at the same locality as the workstation, thereby establishing a transmitter communications path between the originating switch and that telephone. The originating switch then establishes a receiver communications path between the originating switch and the receiver device so that the user can carry on a telephone conversation with the receiver device using the telephone located at the same locality as the workstation 113.

4. The Remote LAN Workstation

Figure 7:
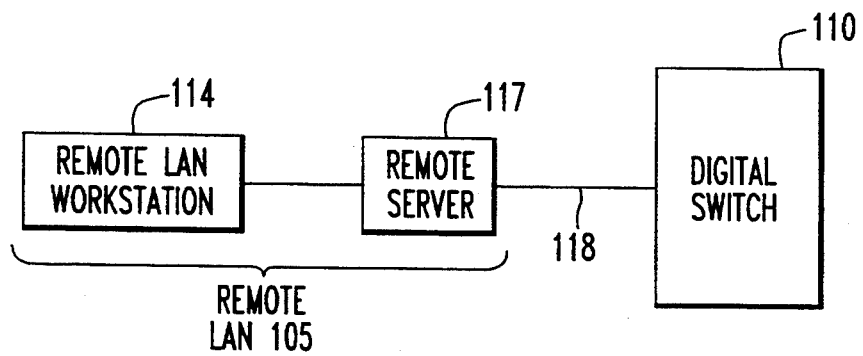
FIG. 7 is a block diagram showing a remote LAN workstation coupled to an initiating digital switch within the telecommunications system of FIG. 3.

FIG. 7 shows a workstation 114 within a remote local area network (LAN) 105. Although referred to as a workstation throughout the present application, component 114 of FIG. 7 (also shown in FIG. 3, for example) could be replaced by a personal computer as an alternate embodiment.

Workstation 114 is coupled to an initiating switch, such as a digital switch 110 used to perform the initiating switch function. The workstation 114 may be selected by the user for use as the selected transmitter device. For example, the user may select workstation 114 to transmit a document or file stored in memory to a receiver device such as a facsimile machine.

Workstation 114 is preferably not located at the same locality as the initiating switch 110. Instead, workstation 114 is part of a LAN 105 that is situated in a location remote from the location of the initiating switch. For example, if the initiating switch is located in San Francisco, the workstation may be located in an overseas location such as London, England. LAN 105 is coupled a LAN (not shown) associated with the initiating switch in a wide area network (WAN) configuration.

With reference to FIG. 7, the remote LAN 105 within which workstation 114 is included also includes a remote server 117. Aside from its location and the manner in which it is connected to other devices, workstation 114 of FIG. 7 is identical to the workstation 113 of FIG. 6. For example, workstation 114 may be modified to include a soft phone card and headset, or a headset interface connecting workstation 114 to a telephone preferably located at the same locality as the workstation.

The telephone number of the receiver device is entered into workstation 114 in the same way that the receiver telephone number is entered into the workstation 113 when the workstation 113 is being used as the selected transmitter device. The way in which the telephone number of the receiver device is entered into workstation 114 (using, for example, input devices such as a mouse and keyboard) can be understood from the detailed description of workstation 113 above.

In response to the entry of the telephone number of the receiver device, workstation 114 forwards the telephone number to a file server 117 within the remote LAN 105 along with the address of workstation 114. As with workstation 113, the workstation address may be entered into workstation 114 by the user prior to entry of the receiver telephone number, or workstation 114 may automatically generate and provide the workstation address in response to entry of the receiver telephone number.

Remote file server 117 forwards both the telephone number of the receiver and the workstation address to the initiating switch on a data line 118. Data line 118 is used to couple the remote LAN 105 including remote workstation 114 and remote file server 117 to the initiating switch. Data line 118 may be either a dedicated 9.6 KBPS (kilobits per second) data line dedicated to the initiating switch, or an X.25 public network.

When the originating switch outputs a ring signal to workstation 114, the display terminal of the workstation indicates that a call is being placed from the originating switch to workstation 114. The user receives the call by depressing and then releasing an answer key on the keyboard or keypad of the workstation, thereby establishing a transmitter communications path between the originating switch and workstation 114.

Figure 8:
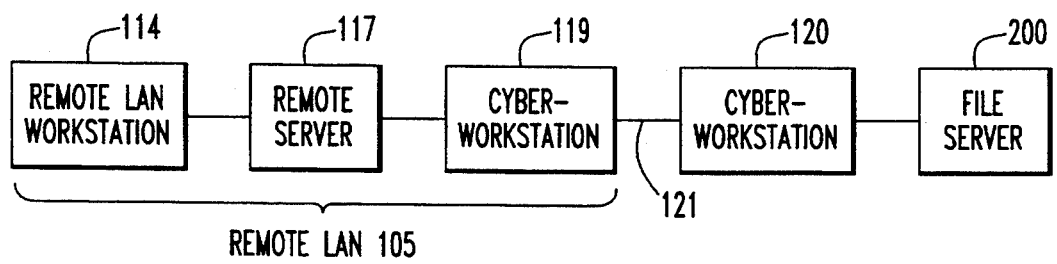
FIG. 8 is a block diagram of a remote LAN workstation coupled to a file server within the telecommunications system of FIG. 3.

In a preferred embodiment, shown in FIG. 8, the remote LAN 105 includes the workstation 114, the file server 117, and an additional workstation 119, and is coupled to provide the workstation address and receiver telephone number directly to the LAN of file server 200 rather than to the initiating switch. Thus, in the preferred embodiment of FIG. 8, a digital switch for performing the initiating function is not required. As can be seen from FIG. 8, remote LAN 105 and the LAN of file server 200 are coupled to one another in a WAN configuration.

The term "cyber-workstation" is used to refer to workstations such as workstation 119 which operate continuously without direct user input. Cyber-workstations, by definition, do not require the presence of a user. Instead, cyber-workstations execute or run programs in the absence of a user. In the preferred embodiment of FIG. 8, the LAN within which file server 200 is included also includes a cyber-workstation 120. FIG. 8 shows that the cyber-workstation 120 can be used in a LAN environment in conjunction with a router or bridge.

Cyber-workstation 119 of the remote LAN 105 and cyber-workstation 120 of the LAN including file server 200 are coupled to one another by a dedicated data line 121. In other words, cyber-workstations 119 and 120 are dedicated to one another. Dedicated data line 121 is a dedicated 9.6 KBPS data line. Each of cyber-workstations 119 and 120 includes a 9.6 KBPS data circuit coupled to data line 121.

In operation, the telephone number of the receiver device is entered into workstation 114 and then output along with the workstation address from workstation 114 into remote file server 117 in the manner discussed in detail above. Rather than being applied to an initiating switch, as is the case with the configuration shown in FIG. 7, such information is extracted from remote file server 117 by dedicated cyber-workstation 119. Next, cyber-workstation 119 forwards the workstation address and receiver telephone number across data line 121 to dedicated cyber-workstation 120 in the LAN of file server 200. Cyber-workstation 120, in turn, converts the data from cyber-workstation 119 into a call record and provides the call record to file server 200. In response to receipt of the call record, file server 200 selects which one of digital switches 110 will be used to establish the communications link between the workstation 114 and the receiver device. File server 200 then outputs a data message to the selected originating switch, causing the originating switch to establish the communications link for the transmission of signals between workstation 114 and the receiver device.

5. Indiscriminately Located Transmitter Devices

Figure 1:
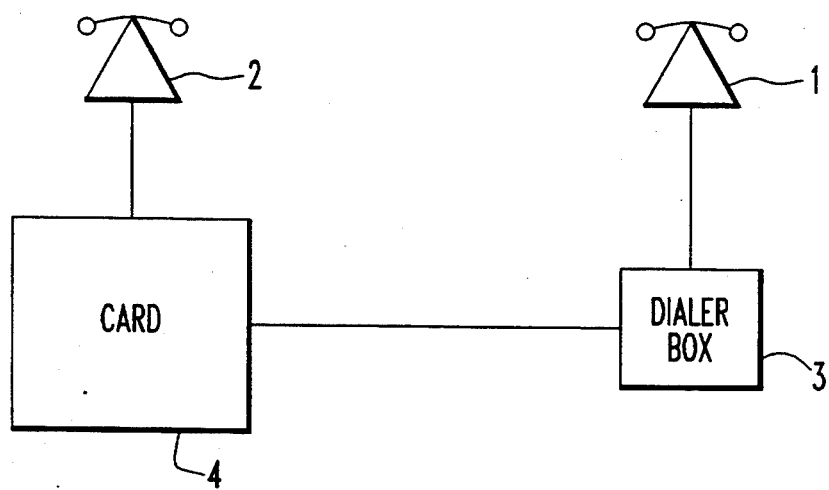
FIG. 1 is a block diagram illustrating a prior art telecommunications system.
Figure 2:
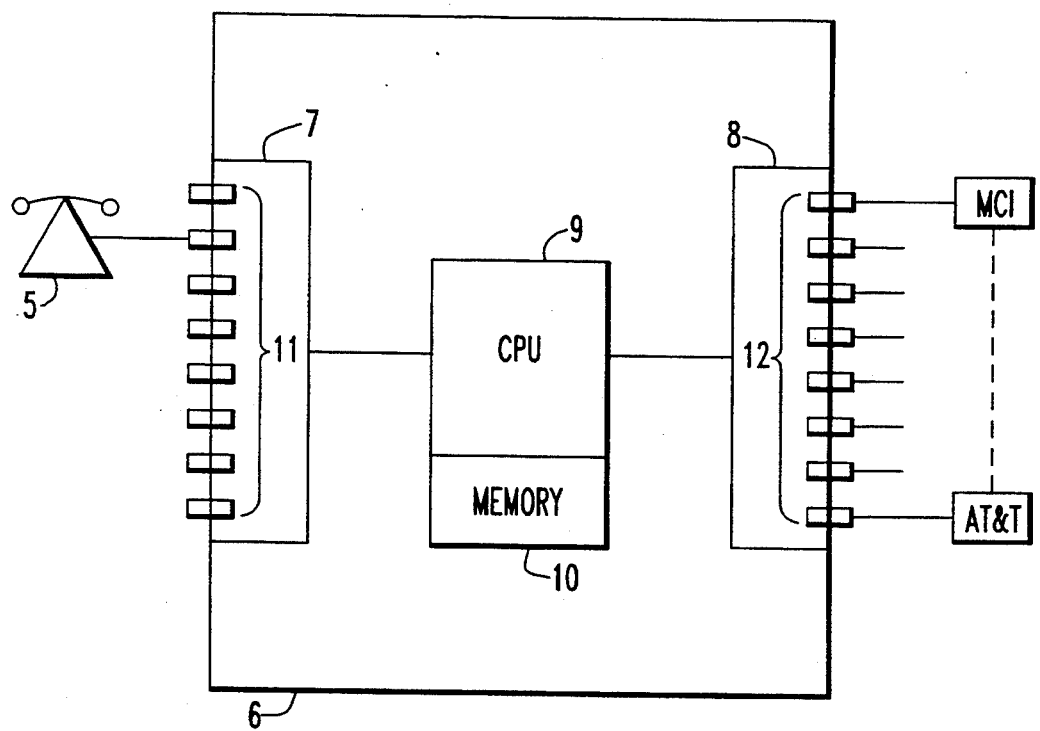
FIG. 2 is a block diagram illustrating another prior art telecommunications system.

Telecommunications system 100 of FIG. 1 may be modified so that pay telephones, personal computers with modems, or other indiscriminately located transmitter devices can be selected for use as the selected transmitter device. Under such a modification, the user will have to enter an additional code each time telecommunications system 100 is accessed. The additional code identifies the telephone number of the selected transmitter device.

C. Digital Switches 110

Figure 9:
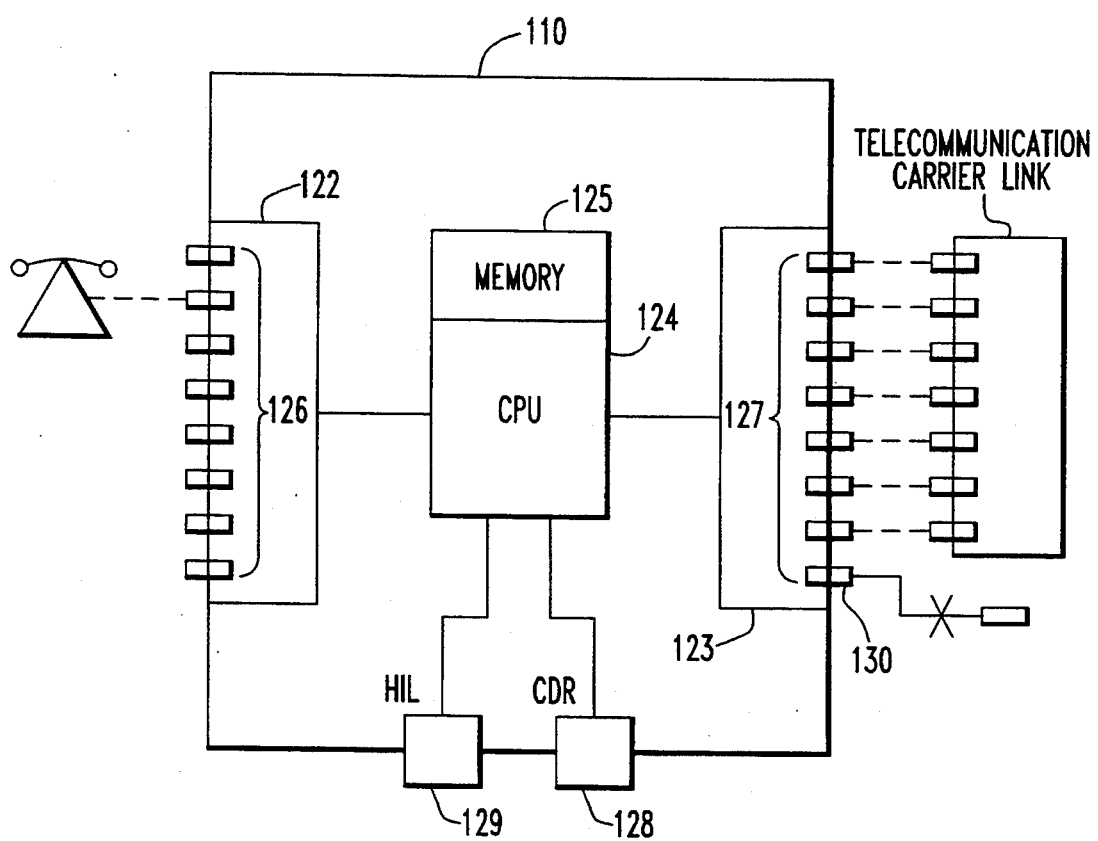
FIG. 9 is a block diagram of the internal structure of one of the digital switches shown in FIG. 3.

A block diagram of a digital switch 110 is shown in FIG. 9. Each digital switch 110 includes a microprocessor capable of operation under the control of a computer program. At least one digital switch 110 may be located in each one or only certain ones of the telecommunications charge zones throughout the world.

Preferably, each digital switch 110 may be used to perform the originating switch function. That is, each digital switch 110 will establish a communications link between the selected transmitter device and the receiver device when provided with a data message from file server 200.

At least one digital switch 110 may be coupled to receive an initiation code from a selected transmitter device and can be used to perform the initiating switch function. Alternatively, a digital switch other than one of digital switches 110 may be used as the initiating switch.

1. Digital Switch Construction

As seen from FIG. 9, each digital switch 110 includes a line card 122, a dedicated T1 trunk card 123, and a central processing unit (CPU) 124 associated with a memory unit 125. Line card 122 has a plurality of line ports 126 for coupling to telephone lines. Trunk card 123 has a plurality of trunk ports 127 which are each coupled to a telephone line owned by a common carrier such as MCI or AT&T.

Each digital switch 110 also has at least two data ports for communicating with file server 200. The first data port is a uni-directional or one-way RS232 data port 128 on which the call record is output to file server 200. The first data port is also known as the call detail reporting (CDR) port. The second data port is a bi-directional or two-way host interface link (HIL) 129 on which control signals can be transmitted to and received from file server 200. The data message generated and output by file server 200 is received by the originating one of switches 110 on the host interface link 129 of that switch.

As shown in FIG. 3, each digital switch 110 is coupled to a corresponding local workstation 101. Each local workstation includes a microprocessor, such as a 486 microprocessor, and a memory unit associated with the microprocessor. Each digital switch 110 is also coupled to a Bell Operating Company (TELCO) 102 in case the private line associated a corresponding workstation 102 is unavailable.

The local workstation 101 for each switch 110 is coupled to receive the call record from the RS232 data port 128 (FIG. 9) of that switch. The local workstation 101 then forwards the call record to file server 200. Also, the data message and other control signals from file server 200 pass through local workstation 101 for application to the host interface link 129 of each digital switch. In essence, each local workstation acts as a buffer between one of digital switches 110 and the LAN of file server 200. Each local workstation 101 also forwards billing information derived from the call record to other locations and stores additional copies of such billing information for backup purposes. A local workstation 101 may also be a cyber-workstation.

As explained above, each digital switch 110 is preferably a Harris 2020 Voice Frame. The Harris Voice Frame is preferred because it has a bi-directional or two-way host interface link port, and is easily controlled by computer program. Also, the Harris 2020 Voice Frame can be interfaced to voice mail, and has a high number (i.e., 100) of conferencing ports for increased conferencing capabilities. Other known digital switches capable of receiving and transmitting telecommunications signals may be used as well, for example, digital switches manufactured by Northern Telecom (Richardson, Tex.), Digital Switch (Richardson, Tex.), Fujitsu (San Jose, Calif.), or Siemens (Hamburg, Federal Republic of Germany).

2. The Initiating Switch Function

At least one digital switch 110, or another digital switch capable of producing a message service request, may function as the initiating switch. In telecommunications system 100 of FIG. 3, the initiating switch is the digital switch 110 that is located in San Francisco because that is the switch connected to the transmitter devices. If desired, the digital switches in Honolulu and/or New York City could also be used as initiating switch in addition to or instead of the digital switch located in San Francisco.

The initiating switch performs several different operations. First of all, the initiating switch receives signals from the selected transmitter device on one of line ports 126, and outputs signals to that transmitter device on that line port. The signals which are output from the initiating switch to the selected transmitter device include a dial tone signal, a "hang up" signal, a signal requesting entry of the telephone number of the receiver device, and a signal requesting entry of the telephone number of the selected transmitter device. The signals which are received by the initiating switch from the selected transmitter device include "off hook" and "on hook" signals, initiation codes, workstation addresses, a signal indicating the telephone number of the receiver device, and a signal indicating the telephone number of the selected transmitter device.

Another operation performed by the initiating switch is the generation and output of a call record 1000 (FIG. 10) to RS232 data port 128 (FIG. 9) in response to receipt of the initiation code (or, alternatively, the initiation code plus one or more of the transmitter and receiver telephone numbers). The call record is a set of information relating to the call being placed from the selected transmitter device.

Figure 10:
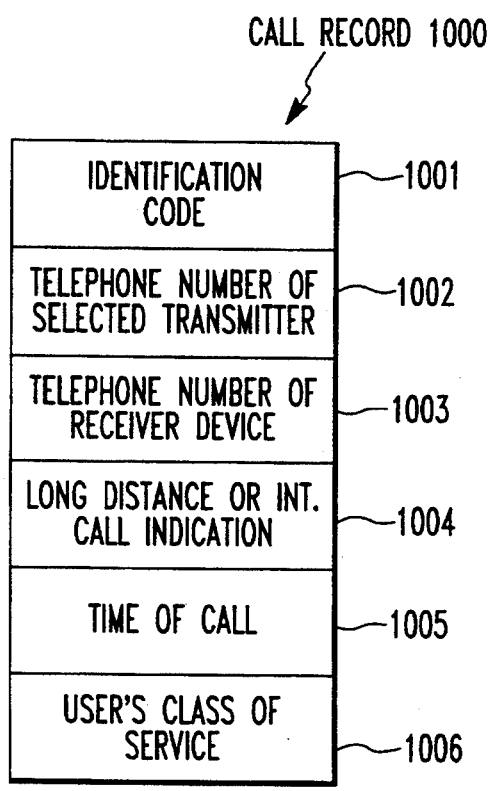
FIG. 10 is an illustration showing the contents of a call record which may be produced by the digital switch shown in FIG. 9.

With reference to FIG. 10, call record 1000 includes an identification code 1001 that is unique to the user. The unique identification code may be derived from the initiation code or from subsequent information entered by the user, or it can be determined based on the telephone number or workstation address of the selected transmitter device. The call record may also include a component 1002 indicating the telephone number of the selected transmitter device, and a component 1003 identifying the telephone number of the receiver device. Other possible components of the call record include a component 1004 indicating that the call to the receiver is a long distance or international call, data 1005 identifying the time of the call (i.e., the current time of day), and a component 1006 identifying the class of service of the user. Component 1003 will not be included in call record 1000 when the initiating switch is not provided with information identifying the telephone number of the receiver device.

The call record is generated under the control of CPU 124 (FIG. 9) of the initiating switch in one of two possible ways. In accordance with one way, the initiating switch generates the call record in response to receipt of the initiation code (or, alternatively, the initiation code plus one or more of the transmitter and receiver telephone numbers) from the selected transmitter device without seizing any of the trunk ports 127. In another way, the initiating switch generates the call record each time one of the trunk ports 127 is seized.

In the latter way, to avoid incurring a telecommunications charge for seizing one of the trunk ports, CPU 124 always seizes a special "no-charge" port 130 whenever the call from the selected transmitter device is a long distance or international call. CPU 124 determines that the call from the selected transmitter device is a long distance or international call from either the initiation code or the telephone number of the receiver that has been entered by the user. Seizure of "no-charge" port 130 does not result in a telecommunications charge because port 130 is not coupled to a telecommunications carrier telephone line.

In the latter method, seizure of the "no-charge" port is the event which causes the initiating switch to output the dial tone signal to the selected transmitter device. Because "no-charge" port 130 is not coupled to a telecommunications carrier telephone line, the dial tone provided in response to seizure of the "no-charge" port is a dial tone originating at the initiating switch rather than the telecommunications carrier.

After the call record is generated, the initiating switch outputs the call record from RS232 data port 128 for application to file server 200 (FIG. 3). As seen from FIG. 3, each digital switch 110 is associated with a microcomputer 101 through which the call record may be passed on to file server 200.

3. The Originating Switch Function

The originating switch receives a data message generated by file server 200 through host interface link 129 (FIG. 9). The data message includes information identifying the telephone number of the selected transmitter device. The data message may also include information identifying the telephone number of the receiver device if such information can be derived from the call record.

Under the control of CPU 124, the originating switch seizes an available trunk port 127 and dials the telephone or extension number of the selected transmitter device. This will cause a ring signal to be output from the originating switch to the selected transmitter device on the seized trunk port. A transmitter communications path is established between the originating switch and the selected transmitter device when the user of the selected transmitter device answers the call (for example, by placing the selected transmitter device in the "off hook" state) in response to the ring signal.

After establishing the transmitter communications path, the originating switch, under the control of CPU 121, seizes another available trunk port and dials the telephone or extension number of the receiver device. If possible, the receiver telephone number is derived by the originating switch from the data message. Otherwise, the receiver telephone number must be input to the originating switch by the user of the selected transmitter device after establishment of the transmitter communications path. The dialing of the receiver device number by the originating switch causes a ring signal to be output from the originating switch to the receiver device on the selected trunk port. A user at the receiver device then answers the call from the originating switch in response to the ring signal, thereby establishing a receiver telecommunications path between the originating switch and the receiver device.

The transmitter communications path and the receiver communications path are coupled at the originating switch to form a communications link between the selected transmitter device and the receiver device. Establishing the communications link allows the transmission of telecommunications signals between the selected transmitter device and the receiver device. Depending on the transmitter and receiver devices being used, the telecommunications signals may be voice signals, signals relaying facsimile document information, or other types of telecommunications signals.

Since the originating switch is the switch which established the communications link between the selected transmitter device and the receiver device, the charge imposed by the telecommunications carrier for transmitting signals will be a charge associated with the originating switch. As discussed in detail below, file server 200 ensures that the charge associated with the originating switch will always be the lowest telecommunications charge available.

As seen from FIG. 3, the telecommunications signals are transmitted into and out of the selected trunk ports of the digital switches 110 on dedicated access facilities (DS1) 103. The dedicated access facility 103 for each digital switch 110 leads to a telecommunications carrier point of presence 104 situated locally with respect to that switch. When a given switch functions as the originating switch, the communications link between the selected transmitter device and the receiver device is established along a dedicated access facility 103 and local point of presence 104 associated with that switch.

D. File Server 200

File server 200 receives the call record output by the initiating switch. In response to receipt of the call record, file server 200 determines which digital switch 110 will be used as the originating switch. File server then generates and outputs a data message to the originating switch. The originating switch establishes a communications link between the selected transmitter device and the receiver device in response to receipt of the data message from file server 200.

1. The File Server Network

File server 200 is an element of a LAN 106 hereafter referred to as the "file server network." With reference to FIG. 3, the file server network comprises file server 200 and a plurality of workstations 120. One workstation 120 is provided for each digital switch 110 in telecommunications system 100. As discussed previously with respect to the preferred embodiment shown in FIG. 8, workstations 120 of the file server network are preferably cyber-workstations.

Figure 11:
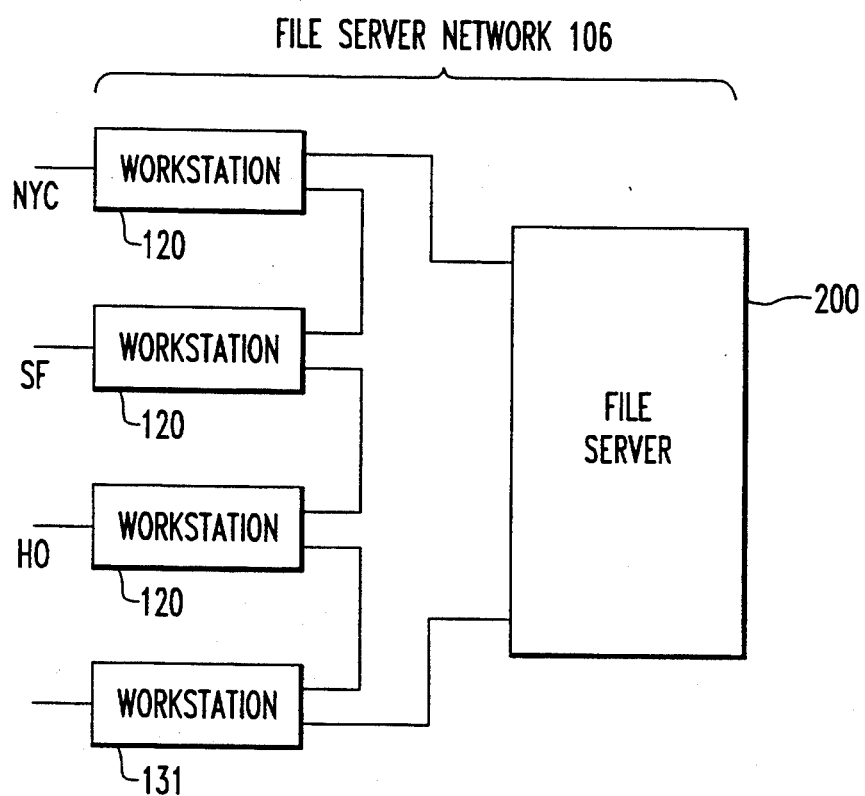
FIG. 11 is a block diagram of a file server network associated with a file server found within the telecommunications system of FIG. 3.

FIG. 11 shows that the file server network 106 may include one or more workstations 131 in addition to those shown in FIG. 3. Additional workstations 131 are preferably cyber-workstations which each perform a function related to the file server network. One of workstations 131, for example, can used to perform a credit check and update function discussed in detail below. Other functions of the file server 200 can also be transferred to one or more of workstations 131. The file server 200, workstations 120, and workstations 131 are preferably coupled to one another within the file server network by a 10 MBPS (megabits per second) Ethernet bus.

The file server network may be set up in any geographic location or telecommunications charge zone regardless of the locations of the digital switches 110. Each workstation 120 of the file server network is preferably coupled to a respective one of digital switches 110 by a 56 KBPS or 9.6 KBPS data circuit. The workstation 120 which is coupled to the initiating switch performs the function of relaying the call record from the initiating switch to file server 200 and placing the call record in a format that may be processed by the file server. This workstation also relays control information from the host interface link 129 of the initiating switch to file server 200. The workstation 120 which is coupled to the originating switch performs the function of relaying the data message from the file server 200 to the originating switch.

Figure 12:
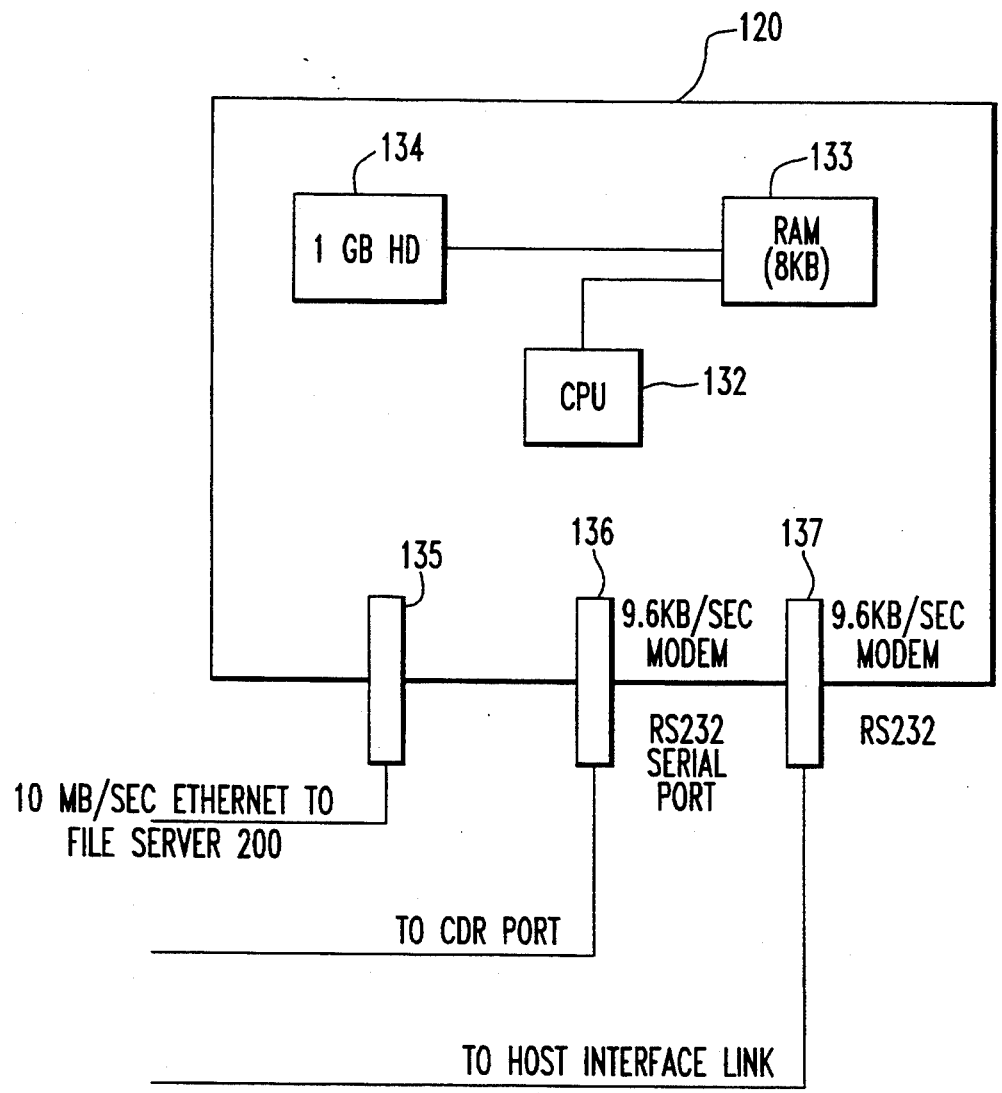
FIG. 12 is a block diagram of a workstation which forms a part of the file server network shown in FIG. 11.

FIG. 12 is a block diagram illustrating the internal structure of a workstation 120. With reference to FIG. 12, each workstation 120 includes a 486 microprocessor 132, 8 KB of RAM (random access memory) 133, and a hard drive including a hard disk 133 for storing up to 1 GB of data. Programs and other data can be loaded into RAM 133 from the hard disk 134 (or from external storage devices such as a magnetic tape drive, not shown) for execution by microprocessor 132.

Each workstation 120 also includes an Ethernet port 135 for communicating with file server 200 and/or other components of the file server network. The call record from the initiating switch may be received by a workstation 120 on an RS232 serial port 136 and through a 9.6 KBPS modem. Control data (including the data message from file server 200) may be transmitted between a workstation 120 and the host interface link 129 of one of digital switches 110 on an RS232 port 137 and through a 9.6 KBPS modem.

2. File Server Construction

Figure 13:
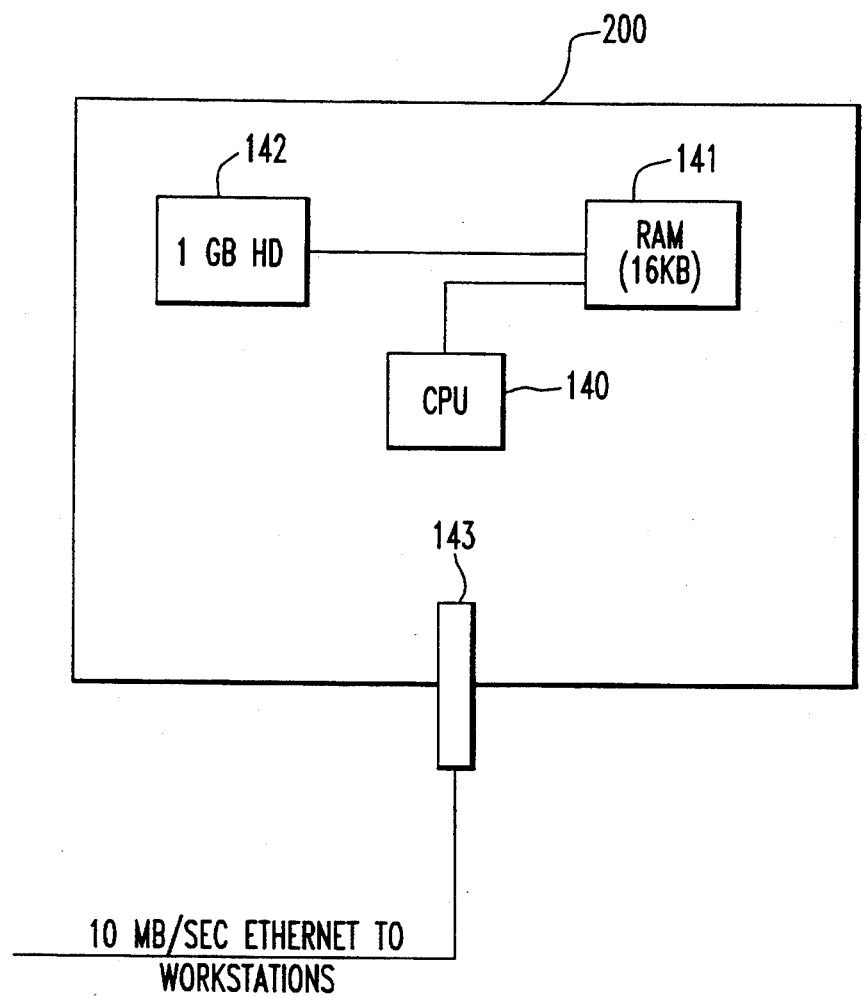
FIG. 13 is a block diagram of the file server which forms a part of the file server network shown in FIG. 11.

FIG. 13 is a block diagram illustrating the internal structure of the file server 200. With reference to FIG. 13, file server 200 includes a 486 microprocessor 140, 16 KB of RAM (random access memory) 141, and a hard drive including a hard disk 142 for storing up to 1 GB of data. Programs and other data can be loaded into RAM 141 from the hard disk 142 (or from external storage devices such as a magnetic tape drive, not shown) for execution by microprocessor 137. File server 200 also includes an Ethernet port 143 for communicating with workstations 120 and 131 of the file server network.

As seen from FIG. 3, file server 200 communicates with digital switches 110 through workstations 120, each workstation of which may be a cyber-workstation. The workstation 120 which is coupled to the initiating switch places the call record from data port 128 (FIG. 9) of the initiating switch in a format that may be processed by the file server, and then forwards the formatted call record to port 143 (FIG. 13) of the file server on the Ethernet bus. The workstation 120 which is coupled to the originating switch relays the data message and other control information from file server 200 to data port 129 (FIG. 13) of the originating switch.

CPU 140 (FIG. 13) of file server 200 executes or runs one or more programs stored in RAM 141. The programs may reside in RAM 141 at all times, or such programs may be loaded into RAM 141 from the hard disk 142 or an external memory accessible by the file server 200 as needed.

A number of data base modules are stored in the memory of file server 200, and/or in external memories (not shown) which are easily accessible by the file server. The modules include data which are used by the file server 200 for generating the data message and/or for performing other functions. The modules may also include programs used in carrying out the functions performed by file server 200. For example, the programs which CPU 140 executes may include programs stored in any one or more of the data base modules.

The data base modules include a PROFILE module, a CREDIT module, a TZONE module, a TARIFFS & RATES module, a COLLECTION module, a REPORTING module, a BILLING module, and a REVENUE module. Additional modules other than those listed above may be stored for use by file server 200. Each of these modules includes a data base which stores information in the form of a look-up table. The look-up tables for such modules may be stored on the hard disk 142 (FIG. 13) of file server 200 (or in external memory accessible by the file server) and read into RAM 141 for processing by CPU 140 as needed.

E. General Operation

Figure 14:
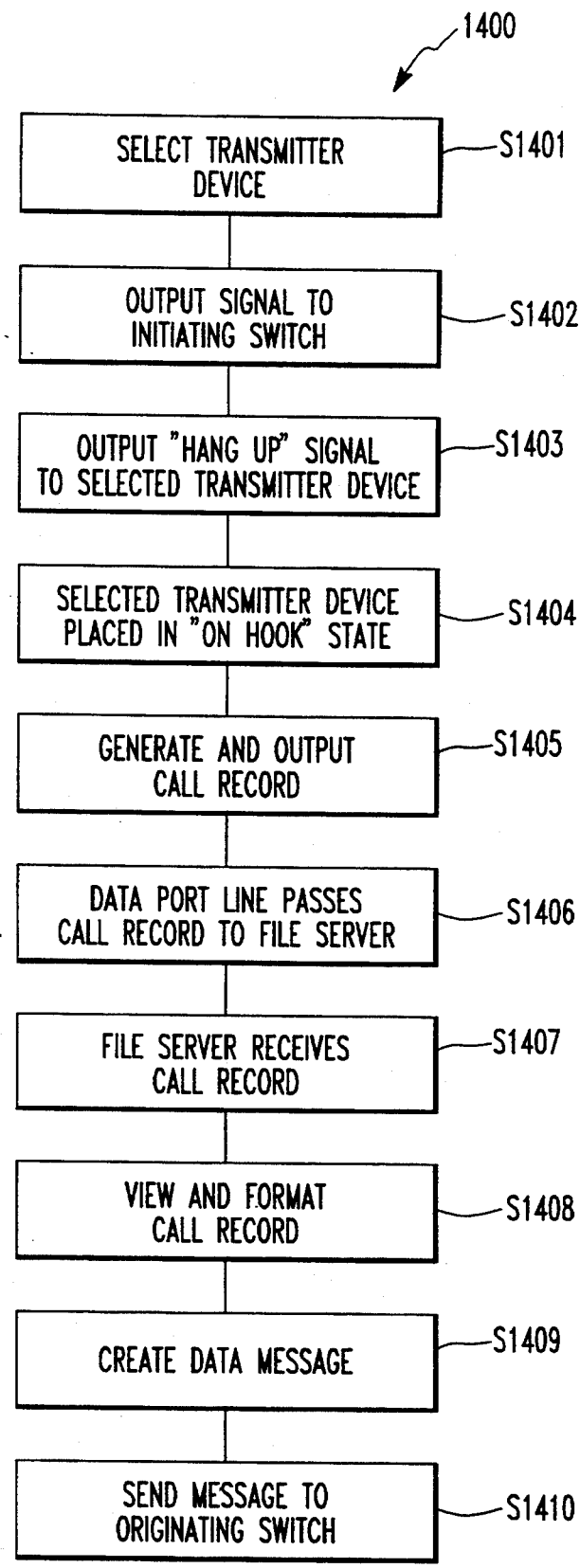
FIG. 14 is a flow diagram illustrating the general function of the telecommunications system shown in FIG. 3.

The general function of telecommunications system 100 may be understood from a flow diagram 1400 shown in FIG. 14. The process steps shown in FIG. 14 are performed using various components of the telecommunication system 100. In FIG. 14, and throughout the present application, the letter "S" precedes the reference numerals which designate process steps.

With reference with FIG. 14, the transmission of information signals between the transmitter and receiver devices is initiated by a user who first selects the transmitter device from which information signals are to be transmitted (step S1401 of FIG. 14). If the transmitter device is a telephone station, a telephone subscriber line, or an indiscriminately located transmitter device, selection is performed by placing the transmitter device in the "off hook" state, and then entering the initiation code. If the transmitter device is a LAN workstation or a remote LAN workstation, then selection is performed by entering the telephone number of a receiver device.

After the appropriate information has been entered into the selected transmitter device by the user, the selected transmitter device outputs a signal (step S1402) for receipt by the initiating switch on a selected line port 126 (FIG. 9). If the transmitter device is a telephone station, a telephone subscriber line, or an indiscriminately located transmitter device, the signal output by the selected transmitter device will include the initiation code entered by the user. The signal may also include information identifying the telephone number of the selected transmitter device if such information cannot be identified from the initiation code. If the transmitter device is a LAN workstation or a remote LAN workstation, the signal output by the selected transmitter device will include the telephone number of the receiver and the address of the selected workstation.

Steps S1403 and S1404 of FIG. 14 are only performed if the selected transmitter device is a telephone station, a telephone subscriber line, or an indiscriminately located transmitter device. If the selected transmitter device is an indiscriminately located transmitter device, steps S1403 and S1404 may be preceded by steps wherein the initiating switch requests and receives information from the selected transmitter device identifying the telephone numbers of the selected transmitter device and the receiver device. If the selected transmitter device is a telephone station or telephone subscriber line, steps S1403 and S1404 may be preceded by steps wherein the initiating switch requests and receives information from the selected transmitter device identifying the telephone number of the receiver device. If the selected transmitter device is a LAN workstation or remote LAN workstation, then steps S1403 and S1404 are omitted.

In step S1403, the initiating switch outputs a "hang up" signal to the selected transmitter device on the selected line port 126 (FIG. 9) causing the selected transmitter device to emit a "hang up" tone. The "hang up" tone is an indication to the user that the selected transmitter device should be placed in the "on hook" state. The user places the selected transmitter device "on hook" in response to the "hang up" tone (step S1404).

Next, the initiating switch generates and outputs the call record 1000 (FIG. 10) to the output data port 128 (FIG. 9) of the initiating switch (step S1405). The initiating switch outputs the call record from the output data port 128 via a data port line to file server 200 (step S1406).

File server 200 receives the call record (step S1407) and stores the call record in RAM 141 (FIG. 13) within the file server. File server 200 then views and formats the call record (step S1408). The formatting of the call record involves converting the call record into a format which file server 200 is capable of processing.

The main function of file server 200 is to create a data message to be output to a digital switch 110 selected for use as the originating switch (step S1409). The data message includes at least three data components: a user call back data component, a coded ringing data component, and a data port address component. These components will be discussed in detail below. File server 200 creates the data message by generating or fetching the individual data components of the data message and thereafter storing the data components together in a data frame in the memory of the file server. When all of the data components of the data message have been stored into a data frame in the memory of file server 200, creation of the data message is complete. After the data message has been created, file server 200 sends the data message to the originating switch (step S1410).

The originating switch, in response to receipt of the data message, establishes a communications link between the selected transmitter device and the receiver device. The establishment of the communications link allows the transmission of information signals between the receiver device and the selected transmitter device. Since the originating switch is the switch which establishes the communications link, the charge imposed by the telecommunications carrier for the transmission of information signals on the communications link will be a charge associated with the originating switch. File server 200 ensures that the charge associated with the originating switch will always be the lowest telecommunications charge available.

1. Creation of the Data Message

Figure 15:
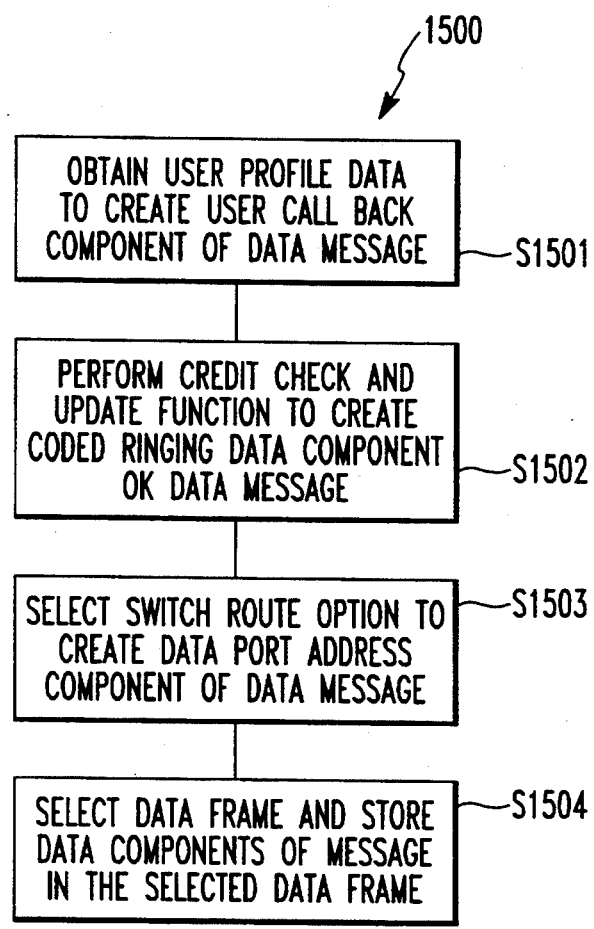
FIG. 15 is a flow chart illustrating a method performed in accordance with one of the steps of the method illustrated in FIG. 14.

FIG. 15 is a flowchart 1500 illustrating the preferred steps which are performed in generating the data message in accordance with step S1409 of FIG. 14. The steps of FIG. 15 are preferably performed by CPU 140 (FIG. 13) of file server 200 under the control of one or more programs stored in RAM 141. The CPU 140 performs the steps of FIG. 15 upon receipt of the call record by the file server from the initiating switch via the workstation 120 associated with the initiating switch. Performance of these steps results in the creation and storage of a data message in RAM 141.

In a preferred embodiment, the data message includes a 144 byte frame of data and at least three data components written into the data frame. The data components written into the data frame include the user call back data component, the coded ringing data component, and the data port address component. These three components of the data message are discussed in detail below.

With reference to FIG. 15, file server 200 creates the data message by generating the user call back data component (step S1501), the coded ringing data component (step S1502), and the data port address component (step S1503) of the data message, and storing such components (step S1504) within a selected data frame that has been loaded into RAM 141 from an external storage device such as a hard disk. The generation and storage of the components of the data message within a selected data frame in accordance with steps S1501, S1502, S1503, and S1504 is carried out by the CPU 140 (FIG. 13) within file server 200.

It should be noted that one or more of steps S1501 through S1504 could be transferred by CPU 140 for performance by one or more of workstations 120 and 131. For example, in the same way that a workstation 120 associated with the initiating switch may be used to view and format the call record rather than CPU 140 of file server 200, workstation 131 may be used to perform step S1502 of FIG. 15 instead of CPU 140.

Steps S1501, S1502, S1503, and S1504 of FIG. 15 are discussed in detail below in sections IV.E.2 through IV.E.5, respectively. The execution of steps S1501 through S1504 results in the creation and storage of the data message in RAM 141 of file server 200. After creation of the data message, CPU 140 (FIG. 13) reads the data message out of RAM 141 for application to the originating switch, causing the originating switch to establish the communications link between the selected transmitter device and the receiver device.

2. The User Call Back Data Component

Figure 16:
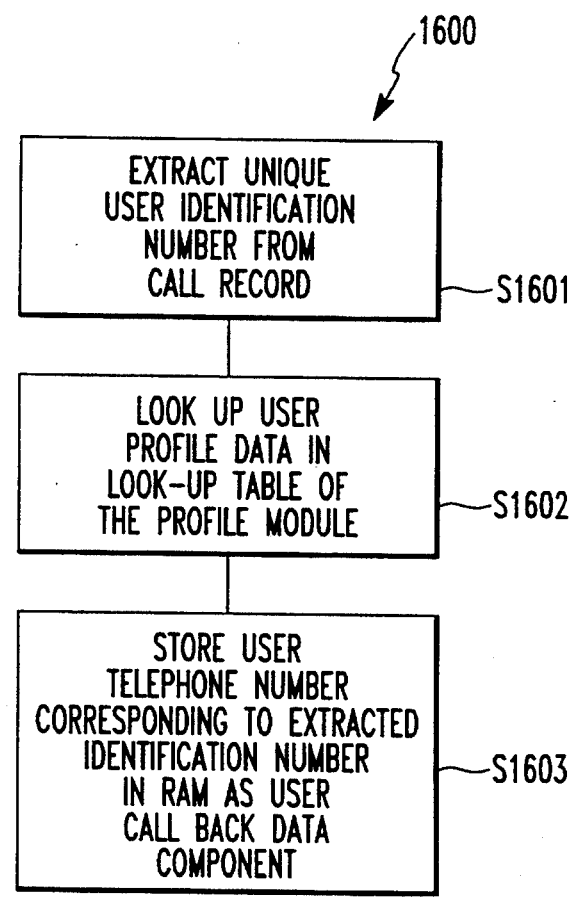
FIG. 16 is a flow chart illustrating a method performed in accordance with one of the steps of the method illustrated in FIG. 15.
Figure 23:
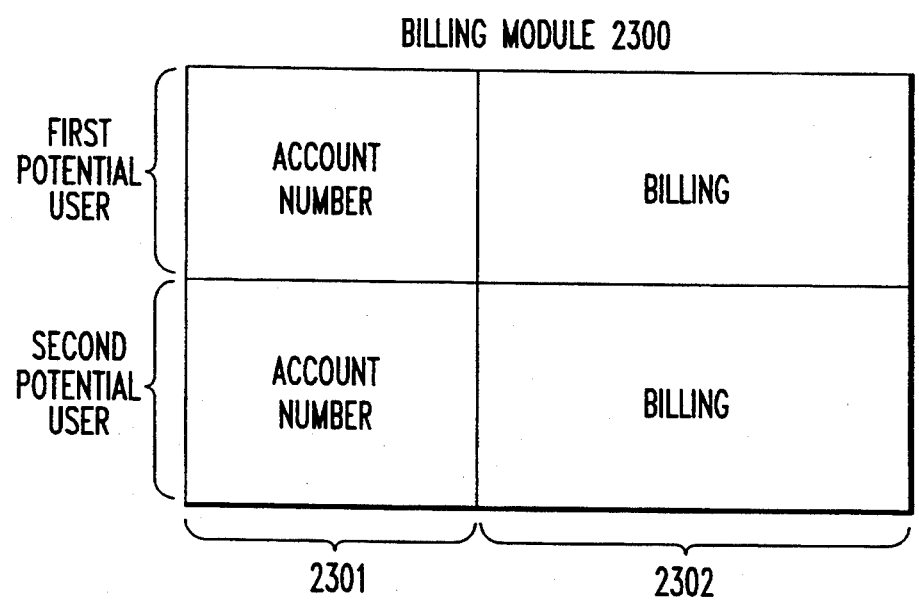
FIG. 23 is a portion of a look-up table associated with still another data base module which may be stored in the file server which forms a part of the file server network shown in FIG. 11.

FIG. 16 is a flow chart 1600 illustrating the preferred steps performed in generating the user call back data component of the data message in accordance with step S1501 of FIG. 23. The method of FIG. 16 may be performed by CPU 140 (FIG. 13) of file server 200 using information obtained from the PROFILE module 1700 partially shown in FIG. 17.

PROFILE module 1700 includes a data base which stores information relating to each potential user of telecommunications system 100. Potential users of telecommunications system 100 are also referred to in the present application as "customers" of the telecommunications system.

The data base of PROFILE module 1700 is stored in the form of a look-up table. In general, the look-up table is stored on the hard disk 142 (FIG. 13) of file server 200 (or in external memory accessible by the file server) and read into RAM 141 for processing by CPU 140 as needed. An explanatory portion of the look-up table of PROFILE module 1700 is shown in FIG. 17.

Figure 17:
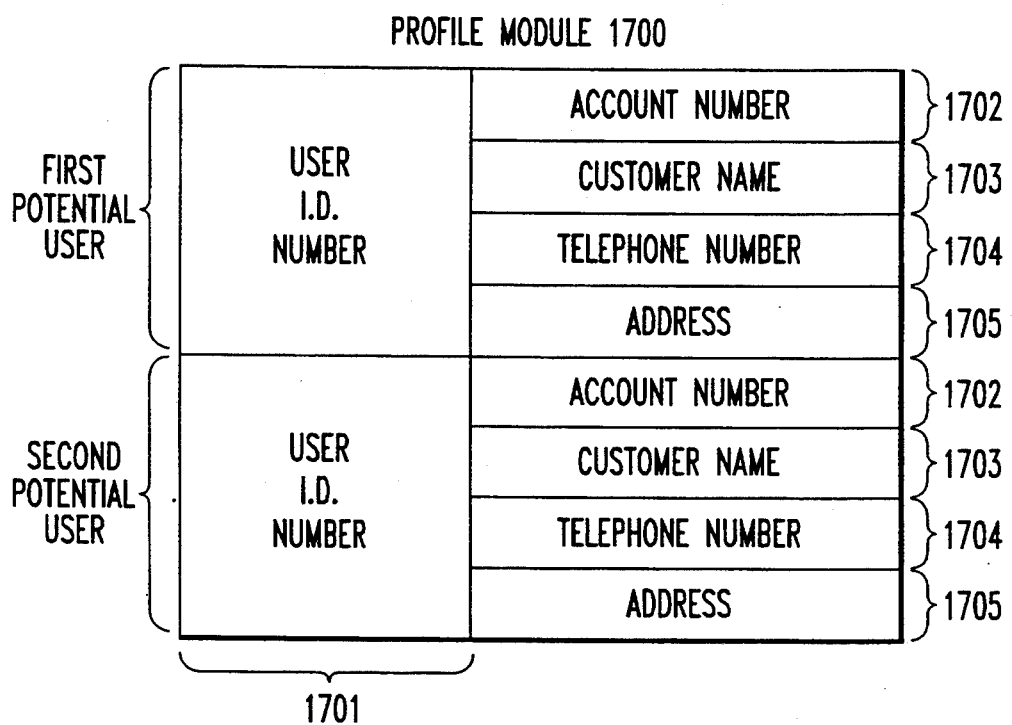
FIG. 17 is a portion of a look-up table associated with a data base module which may be stored in the file server which forms a part of the file server network shown in FIG. 11.

With reference to FIG. 17, the PROFILE module look-up table includes a user identification number field 1701. The user identification number in field 1701 is a unique number assigned to each potential user. The user identification number appears in the call record which is generated each time the user initiates a call or signal transmission. The user identification number may be, for example, a telephone station extension number, a subscriber line telephone number, a workstation address, or some other number.

Other fields of the PROFILE module look-up table include a customer account number field 1702, a customer name field 1703, a customer telephone number field 1704, and a customer address field 1705. The customer account number of field 1702 is a unique number assigned to each potential user upon subscribing for use of telecommunications system 100. The name, telephone number, and address fields 1703 through 1705, respectively, are self-explanatory.

The information in fields 1702 through 1705 is known as user profile data. Data is written into fields 1701 through 1705 of the PROFILE module look-up table by manual operator entry.

With reference to FIG. 16, CPU 140 first extracts, from the stored call record, an identification number (e.g., a 10-digit code) that is unique to the user of the selected transmitter device (step S1601). CPU 140 then performs a look-up function using the look-up table of the PROFILE module 1700 partially shown in FIG. 17. In particular, CPU 140 looks up the user profile data stored in the look-up table of the PROFILE module that corresponds to the unique identification number extracted from the call record (step S1602). The user profile data includes, for example, the customer account number, name, telephone number, and address stored in fields 1702 through 1705 of the PROFILE module look-up table. CPU 140 then outputs the telephone number of the user for storage in RAM 141 as the user call back component of the data message (step S1603). The telephone number of the user is the telephone number stored in the telephone number field 1704 of the PROFILE module look-up table which corresponds to the unique identification number extracted from the call record in step S1601.

Although not explicitly shown in FIG. 16, the generation of user call back data may also include the step of extracting the telephone number of the receiver device from the call record, and storing the extracted receiver telephone number in RAM 141 as part of the user call back data component.

3. The Coded Ringing Data Component

Figure 18A:
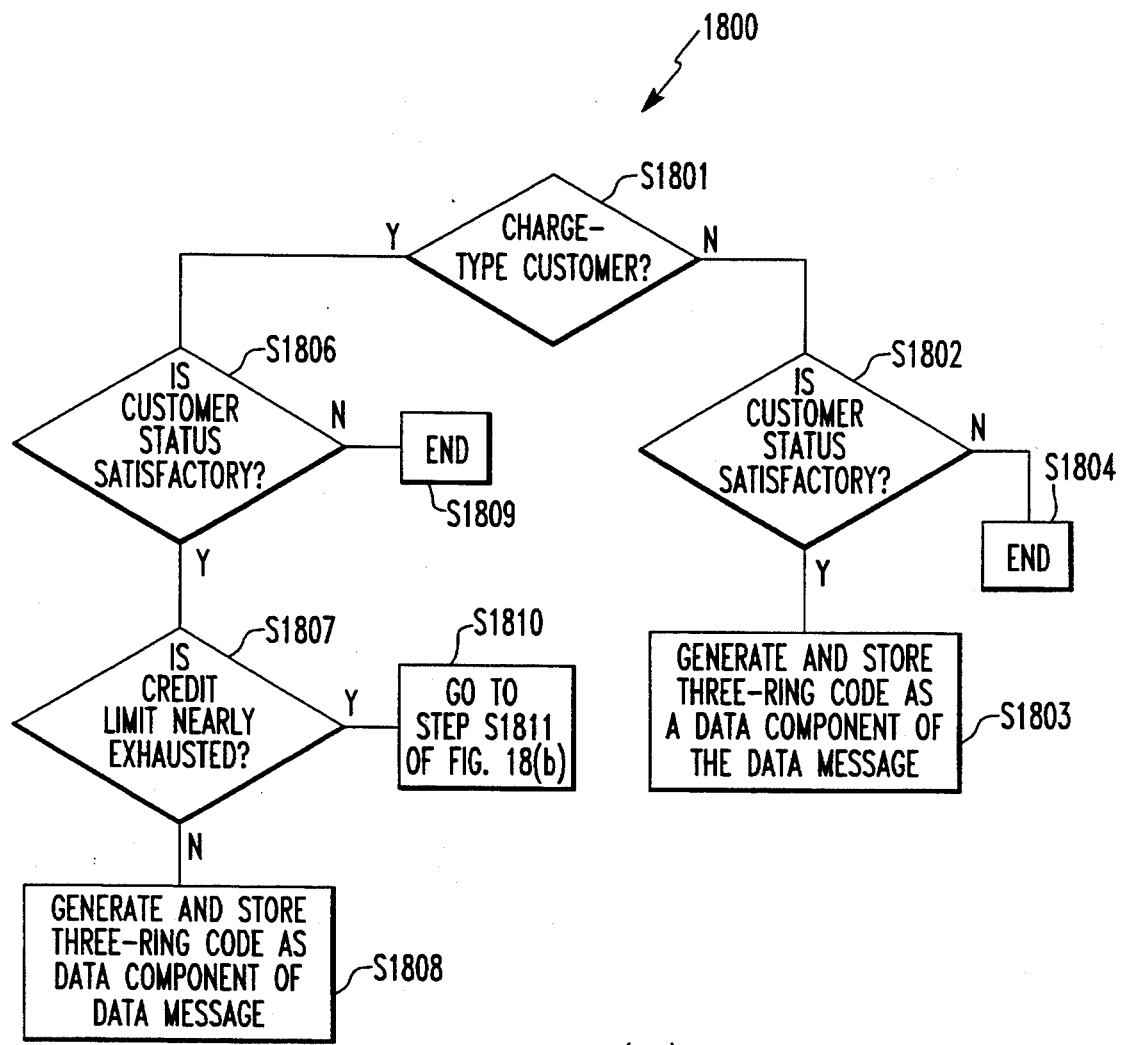
FIG. 18(a) is a flow chart illustrating one part of a method performed in accordance with one of the steps of the method illustrated in FIG. 15.
Figure 18B:
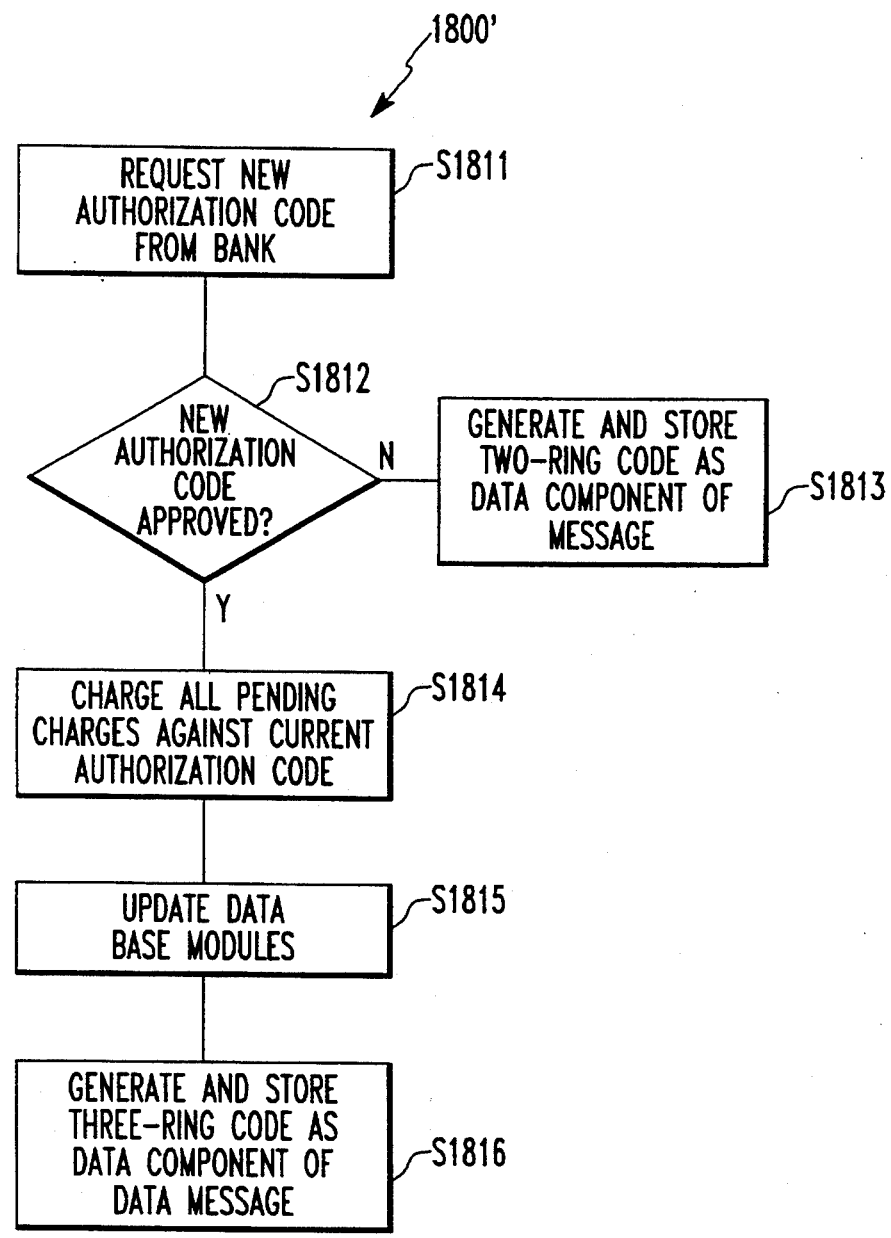
FIG. 18(b) is a flow chart illustrating another part of the method illustrated in FIG. 18(a).

FIGS. 18(a) and 18(b) contain flow charts 1800 and 1800', respectively, illustrating preferred steps performed in generating the coded ringing data component of the data message in accordance with step S1502 of FIG. 15. The steps of FIGS. 18(a) and 18(b) may be performed by CPU 140 (FIG. 13) of file server 200, or by workstation 131 in file server network 106 (FIG. 11), using information obtained from the PROFILE module 1700 partially shown in FIG. 17, the CREDIT module 1900 partially shown in FIG. 19, the REVENUE module 2000 partially shown in FIG. 20, and the REPORTING module 2100 partially shown in FIG. 21.

A discussion of the CREDIT, REVENUE, and REPORTING modules will be provided before the detailed discussion of the steps shown in FIGS. 18(a) and 18(b). The PROFILE module has already been discussed above in connection with FIG. 17.

Telecommunications system 100 imposes charges on those customers who place calls using the telecommunications system. Each potential user of telecommunications system 100 may be either a charge-type customer or a direct billing customer. Calls placed by a charge-type customer are charged to a credit card of the charge-type customer. Calls placed by a direct billing customer are paid for directly by the direct billing customer.

The charging of telephone calls is controlled by a banking institution working in conjunction with the credit card company and the owner or operator of telecommunications system 100. Each week, the banking institution issues an authorization code for each potential user of telecommunications system 100 authorizing the charging of a certain monetary amount (e.g., $250.00) of calls per week. The amount of money associated with the authorization code is known as the credit limit of that authorization code. Pending charges may be built up against the current authorization code up to the amount of the credit limit. The charging of calls in an amount greater than the credit limit can only be accomplished by requesting and receiving a new authorization code from the banking institution. When a new authorization code is issued, all pending charges are charged against the current authorization code, and then the new authorization code becomes the current authorization code.

With reference to FIG. 19, CREDIT module 1900 includes a data base which stores information relating to the credit record of each potential user of telecommunications system 100. The data base of CREDIT module 1900 is stored in the form of a look-up table. The look-up table may be stored on the hard disk 142 (FIG. 13) of file server 200 (or in external memory accessible by the file server) and read into RAM 141 for processing by CPU 140 as needed. Alternatively, the look-up table may be stored in RAM 141 of file server 200 at all times.

An explanatory portion of the look-up table of CREDIT module 1900 is shown in FIG. 19. The portion of the look-up table shown in FIG. 19 corresponds to the credit record for a single one of the potential users.

Like the PROFILE module look-up table, the look-up table for CREDIT module 1900 includes an account number field 1901 for each potential user. CREDIT module 1900 also includes a current credit card number field 1902, a credit card expiration date field 1903, a current billing address field 1904, and a history of revenue field 1905. The current credit card number and expiration date fields 1902 and 1903 store the credit card number of the potential user and the expiration date of that credit card, respectively. The current billing address field 1904 stores the billing address for the current credit card. The history of revenue field 1905 for each potential user stores data indicating how much total revenue has been received from that potential user to date.

As seen from FIG. 19, the CREDIT module look-up table also includes a current authorization code field 1906, a credit line field 1907, a pending charges field 1908, a date of last charge field 1909, a new authorization code field 1910, and a customer status field 1911. The current authorization code field 1906 stores the current authorization code approved by the banking institution for a potential user. The credit line field 1907 stores information indicating the credit limit associated with the current authorization code. The pending charges field 1908 and date of last charge field 1909 store the charges pending against the current authorization code and the date of the last charge made against the current authorization code, respectively. The new authorization code field 1910 stores the code which the potential user will be able to charge calls against when the current authorization code is no longer valid. The customer status field 1911 for each potential user indicates whether or not that potential user has an approved credit status.

Data is written into fields 1902 through 1904 by manual operator entry. The information of field 1905 may also be input by way of manual operator entry, or it may be generated and updated automatically by file server 200 as the revenue from each customer is collected. The information of fields 1906 through 1910 is automatically generated and updated by file server 200 in response to information received from the banking institution. File server 200 automatically generates and updates the customer status field as customers make calls and pay for (or fail to pay for) such calls.

Figure 20:
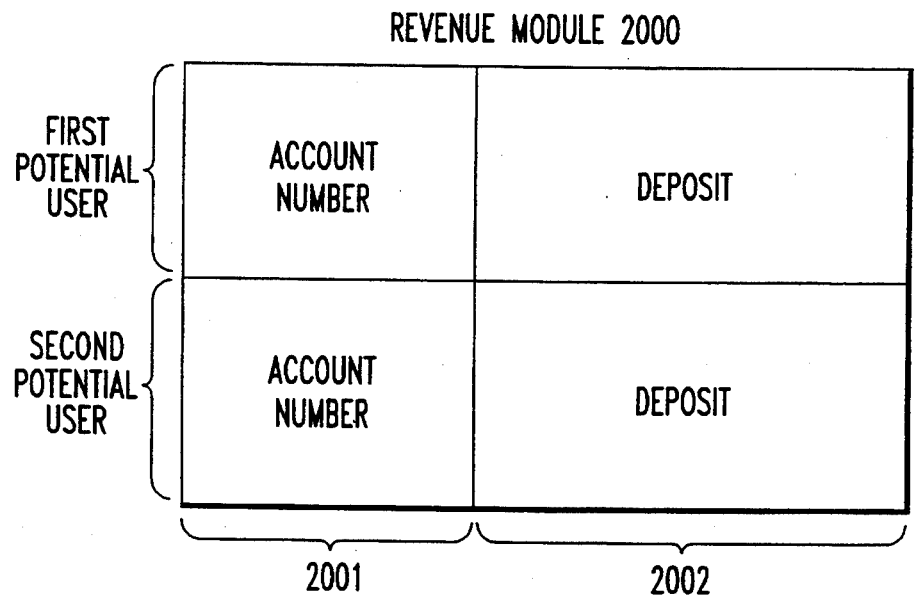
FIG. 20 is a portion of a look-up table associated with a yet another data base module which may be stored in the file server which forms a part of the file server network shown in FIG. 11.

FIG. 20 shows an explanatory portion of the look-up table for the REVENUE module 2000. The REVENUE module is actually a receivables data base indicating the amount of money that has been deposited in the bank as a result of the clearing of credit card charges imposed for the use of telecommunications system 100. The look-up table for the REVENUE 2000 module includes an account number field 2001 and a deposit field 2002 storing data which indicates the amount of money deposited in the bank from each customer. The fields of REVENUE module 2000 are updated automatically based on information received from one or more banking institutions, or may be manually updated.

Figure 21:
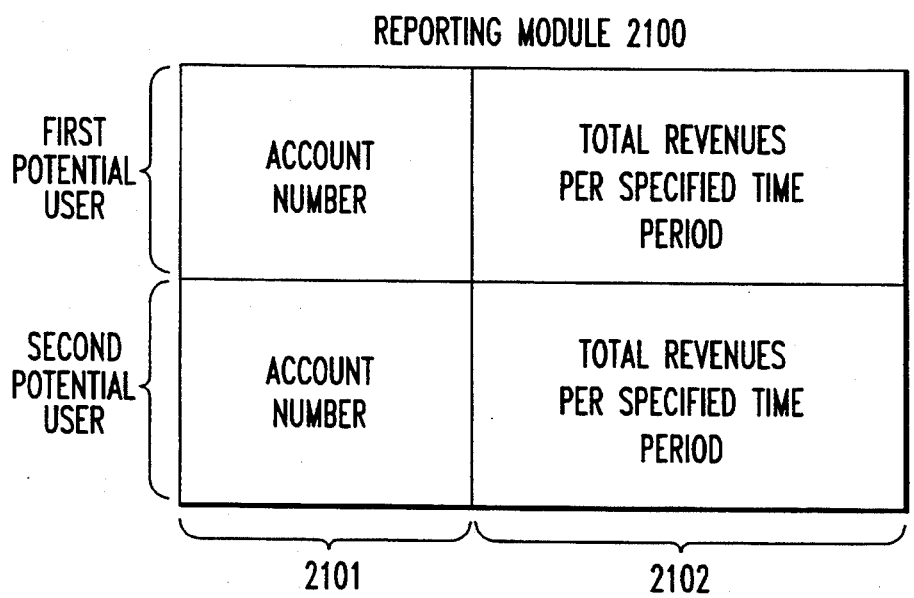
FIG. 21 is a portion of a look-up table associated with still another data base module which may be stored in the file server which forms a part of the file server network shown in FIG. 11.

FIG. 21 shows an explanatory portion of the look-up table for the REPORTING module 2100. The REPORTING module 2100 may be used to generate paper reports which indicate total revenues per account number for a period of time such as a day or a month. The look-up table for REPORTING module 2100 includes a customer account number field 2101 and a total revenues field 2102. The total revenues field 2102 indicates the total revenue received from each account number over the specified time period. REPORTING module 2100 may be manually updated, or automatically updated by file server 200 based on information received from banking institutions and credit card companies.

Turning to flow chart 1800 of FIG. 18(*a*), after the user call back component of the data message has been stored in RAM 141 (FIG. 13), CPU 140 uses information stored in the PROFILE module look-up table to determine whether the user of the selected transmitter device is a charge-type customer or a direct billing customer (step S1801). If the user is a direct billing customer, then CPU 140 determines the status of the user from CREDIT data module 1900 partially shown in FIG. 19 (step S1802). A customer's status is satisfactory if no pending charges against the customer's account are past due.

If the current status of the user is satisfactory, CPU 140 generates and stores, as a data component of the data message, coded ringing data that will cause the selected transmitter device to ring three times (or perform an analogous indication) upon receipt of the data message (step S1803). In the preferred embodiment, the three rings are a sign to the user that enough credit is available to make the desired call. The user places the selected transmitter device into the "off hook" state in response to the three ring signal, thereby establishing a communications link between the selected transmitter device and the receiver device.

In step S1802, if the customer status of the user is unsatisfactory, CPU 140 terminates the process of creating the data message for that user (step S1804). CPU 140 does not allow the establishment of communications links through the use of telecommunications system 100 when the status of the user of the selected transmitter device is unsatisfactory.

If, at step S1801, CPU 140 determines that the user of the selected transmitter device is a charge-type customer, then CPU 140 determines the status of the user using information from CREDIT module 1900 of FIG. 19 (step S1806). If the current status of the user is unsatisfactory, then CPU 140 terminates the process of creating a data message for that user (step S1809). If the current status of the user is satisfactory, then CPU 140 determines from CREDIT profile 1900 whether that user is nearing the credit limit associated with that user's current authorization code (step S1807). For example, step S1807 may be performed to determine whether less than 10% of the user's current authorized credit remains. If the user is not within the last 10% of the current authorized credit limit, then CPU 140 generates and stores, as a data component of the data message, the coded ringing data that will cause the selected transmitter device to ring three times upon receipt of the data message (step S1808).

In step S1807, if the credit limit of the user is nearly exhausted, then CPU 140 will perform the steps illustrated in flow chart 1800' of FIG. 18(*b*) (step S1810). In accordance with step S1811 of the flow chart 1800' shown in FIG. 18(*b*), CPU 140 requests a new authorization code for the user from the banking institution which handles that user's charges. If the banking institution does not provide a new authorization code (step S1812), then CPU 140 generates and stores, as a data component of the data message, coded ringing data that will preferably cause the selected transmitter device to ring only two times (or perform an analogous indication) upon receipt of the data message (step S1813). The two rings indicate to the user that although the requested call may be completed, the user is nearing the end of that user's current authorized credit limit. As in the situation where the selected transmitter device rings three times, the user may place the selected transmitter device in the "off hook" state to establish the communications link between the selected transmitter device and the receiver device in response to the two ring signal.

Alternatively, the user may respond to the two ring signal by providing, to the owner or operator of telecommunications system 100, a new credit card number against which calls can be charged. This number can be called in to the owner/operator or sent via facsimile. Upon receipt of the new credit card number, the number is entered manually into the credit card number field of PROFILE module 1700 (FIG. 17). Subsequent calls by the user may then be charged against the new credit card number even if the credit limit authorized for the first credit card is nearly exhausted.

If, at step S1812 of FIG. 18, the bank authorizes the new authorization code, then all of the pending charges against the current authorization code are charged (step S1814). CPU 140 of file server 200 then updates certain ones of the data base modules to reflect the charge against the current authorization code and the approval of the new authorization code (step S1815). For example, CPU 140 updates the history of revenue field 1905 in CREDIT module 1900 (FIG. 19) and the deposit field 2002 of REVENUE module 2000 (FIG. 20) to reflect the revenue resulting from the charge against the current authorization code; inserts the credit limit associated with the new authorization code into field 1907 of the CREDIT module; clears the pending charges field 1908 of the CREDIT module and updates the date of last charge field 1909; and transfers the new authorization code from field 1910 of the CREDIT module to the current authorization code field 1906. Other data base module fields, such as field 2102 of REPORTING module 2100, could also be automatically updated by file server 200 at this point if desired.

After the data base modules are updated in accordance with step S1815 of FIG. 18(b), CPU 140 of file server 200 generates and stores, as a data component of the data message, the coded ringing data that will cause the selected transmitter device to ring three times upon receipt of the data message (step S1816).

It should be noted that CPU 140 of file server 200 automatically requests a new authorization code for each customer on a weekly basis. When the weekly request is approved by the appropriate banking institution, the pending charges against the current authorization are charged as in step S1814 of FIG. 18(b), and the data base modules are updated as in step S1815 of FIG. 8(b).

Like the REVENUE and REPORTING modules, the COLLECTION and BILLING modules store information relating to the financial status of each customer. Portions of the COLLECTION and BILLING modules are shown in FIGS. 22 and 23, respectively.

Figure 22:
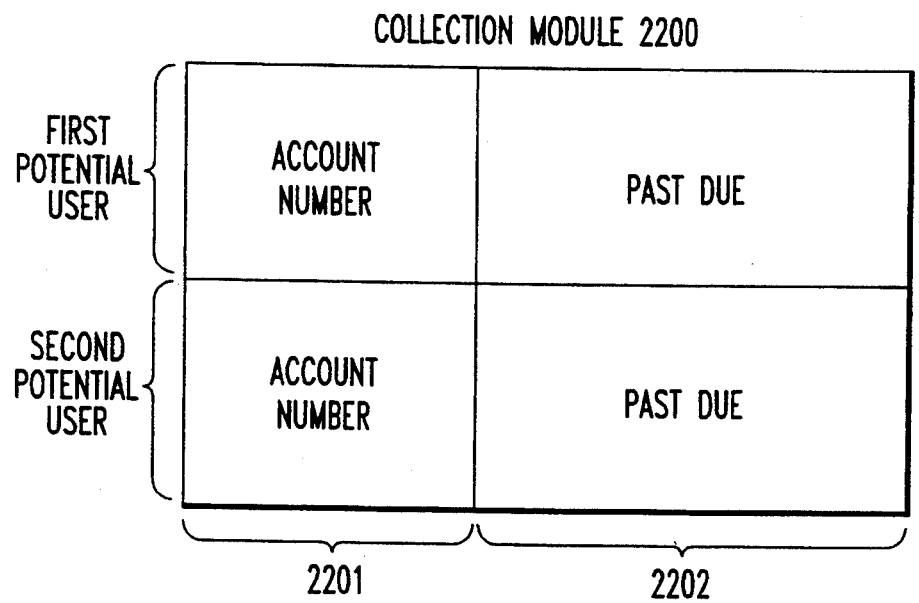
FIG. 22 is a portion of a look-up table associated with yet another data base module which may be stored in the file server which forms a part of the file server network shown in FIG. 11.

An explanatory portion of the look-up table for COLLECTION module 2200 is shown in FIG. 22. COLLECTION module 2200 is only used for customers that are billed directly. COLLECTION module 2200 does not apply to charge-type customers who charge calls to credit cards. As seen from FIG. 22, the look-up table for the COLLECTION module includes an account number field 2201 and a past due field 2202. The past due field 2202 stores information indicating the charges that are past due for each customer account number. The fields of COLLECTION module 2200 are updated automatically by file server 200 based on information received from one or more banking institutions, or may be manually updated.

An explanatory portion of the look-up table for the BILLING module 2300 is shown in FIG. 23. The look-up table for BILLING module 2300 provides an indication of the amount that was billed for use of telecommunications system 100 during a specified time period. The BILLING module includes a customer account number field 2301, and also a billing field 2302 indicating how much each customer was billed during some period. The fields of BILLING module 2300 may be updated manually or automatically by file server 200 as customer bills are generated.

4. The Data Port Address Component

Figure 24:
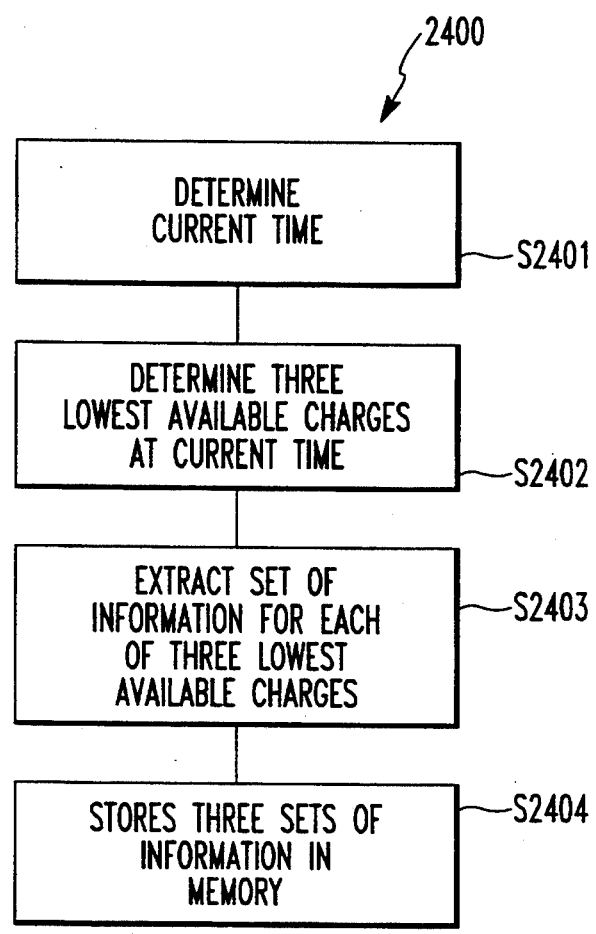
FIG. 24 is a flow chart illustrating a method performed in accordance with one of the steps of the method illustrated in FIG. 15.

FIG. 24 is a flow chart 2400 illustrating the steps performed in generating the data port address component of the data message in accordance with step S1503 of FIG. 15. The steps of FIG. 24 may be performed by CPU 140 (FIG. 14) of file server 200 using information obtained from the TZONE module 2500 partially shown in FIG. 25. The information in TZONE module 2500, in turn, is obtained from the TARIFFS & RATES module 2600 partially shown in FIG. 26.

TZONE module 2500 actually includes a plurality of data base sub-modules, one for each country. The sub-module for each country includes a data base which stores information relating to that country.

The data base of each TZONE sub-module is stored in the form of a look-up table. The look-up tables for the sub-modules of the TZONE module are stored on the hard disk 142 (FIG. 13) of file server 200 (or in external memory accessible by the file server) and read into RAM 141 for processing by CPU 140 as needed.

A portion of a look-up table for the sub-module of TZONE module 2500 which corresponds to the United States is shown in FIG. 25. With reference to FIG. 25, the look-up table for each sub-module of the TZONE module includes a country code field 2501 including the dialing code of the country of that sub-module. As seen from field 2501 of FIG. 25, the dialing code for the United States may be "1." Each look-up table also includes a charge zone code field 2502 identifying the dialing code of each charge zone in the country. The dialing code for the charge zone associated with San Francisco, for example, is "415."

As explained above, each charge zone is associated with different telecommunications charges depending on the time of day in the charge zone. Telecommunications charges are generally highest during the day (standard charges), somewhat lower in the early evening (discount charges), and lowest during the late evening and morning hours (economy charges). The look-up table for the sub-module for each country includes a charge times field 2503 which identifies the time periods associated with the standard, discount, and economy charges for each charge zone.

The look-up table for the sub-module for each country also includes a carrier field 2504 indicating telecommunications carriers which provide service to each charge zone of that country. In FIG. 25, three carriers (MCI, AT&T, and SPRINT) provide service to each telecommunications charge zone in each of the standard, discount, and economy charge times. However, carrier field 2504 may be expanded to identify additional telecommunications carriers as needed to reflect existing carrier availabilities. A charge field 2505 of the look-up table stores the telecommunications charges associated with each of the carriers for the different charge times and charge zones. The charge field 2505 reflects current discounts or special rates, if any, that are being offered by the telecommunications carriers.

File server 200 automatically generates and updates the information in fields 2501 through 2505 for each sub-module depending on the information currently stored in TARIFFS & RATES module 2600 (discussed in detail below). Alternatively, the information of fields 2501 through 2505 may be generated and entered into each sub-module by manual entry.

TARIFFS & RATES module 2600 is a module which is used to construct the sub-modules of TZONE module 2500. The information for the fields of the TZONE sub-modules is read into the TZONE module from sub-modules contained in TARIFFS & RATES module 2600. The main difference between TZONE module 2500 and TARIFFS & RATES module 2600 is that the sub-modules of the TZONE module are organized in a country by country arrangement, while the sub-modules of the TARIFFS & RATES module are organized in a carrier by carrier arrangement.

Figure 26:
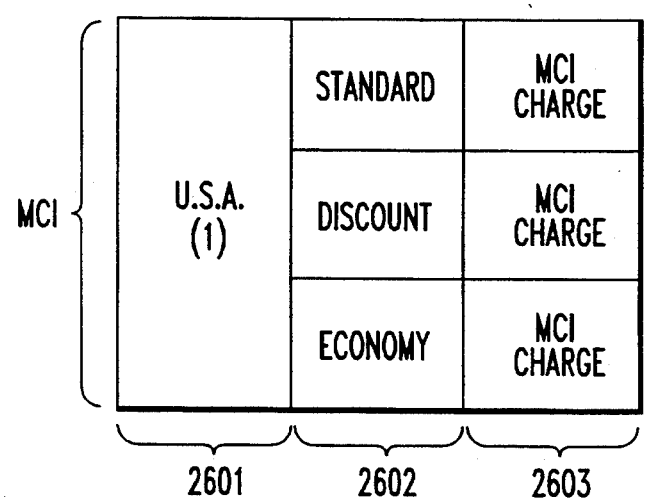
FIG. 26 is a portion of a look-up table associated with a sub-module of another data base module which may be stored in the file server which forms a part of the file server network shown in FIG. 11.

FIG. 26 shows an explanatory portion of the look-up table for the TARIFFS & RATES module 2600. The look-up table portion of FIG. 26 is from the TARIFFS & RATES sub-module corresponding to the telecommunications carrier MCI. With reference to FIG. 26, the look-up table for each carrier sub-module includes a country code field 2601 identifying the country corresponding to that sub-module, a charge times field 2602 identifying the time periods associated with the standard, discount, and economy charges for each charge zone of that country, and a charge field 2603 storing the telecommunications charges for the different charge time periods and charge zones.

The data of the TARIFFS & RATES module 2600 are downloaded into TZONE module 2500 on a quarterly basis from one or more data bases external to file server 200. After such downloading, file server 200 automatically updates the information in TZONE module 2500 depending on the information downloaded into TARIFFS & RATES module 2600. The special or discount rate information for field 2505 of TZONE module 2500 may be read into the TZONE module from TARIFFS & RATES module 2600, or it can be entered manually on a basis more frequent than the quarterly downloading basis.

Turning now to FIG. 24, after the generation and storage of the user call back and coded ringing data components of the data message, CPU 140 (FIG. 13) determines the current time (step S2401). CPU 140 makes this determination using either an internal timer of file server 200, or current time information contained in the call record received from the initiating switch.

CPU 140 then searches through the charge field 2505 in each of the sub-modules of the TZONE module 2500 (FIG. 25) to determine the three lowest available charges at the current time determined in step S2401 (step S2402). In performing step S2402, CPU 140 only searches through those portions of each charge field 2505 that correspond to the time periods in charge times field 2503 which include the current time determined in step S2401.

Next, CPU 140 extracts, from the TZONE sub-modules, one set of information for each of the three lowest available charges (step S2403). Each set of extracted information identifies the data port address of a digital switch 110 found in the telecommunications charge zone corresponding to one of the three lowest available charges, and the numbers of trunk ports contained in that digital switch. The trunk port numbers identified by each set of information are the numbers of the trunk ports which connect to the telecommunications carrier corresponding to the charge for that set.

Following step S2403, CPU 140 stores the three sets of information in RAM 141 (FIG. 13) of file server 200 (step S2404). One of the three sets of information will be used as the data port address component of the data message. Preferably, the set of information which will be used as the data port address component will be the set corresponding to the lowest available telecommunications charge. However, if the switch or data ports identified by this set of information turn out to be unavailable, then one of the other sets of information may be used as the data port address component.

It should be noted that if the call record received by file server 200 does not indicate the telephone number of the receiver device, then file server 200 determines the lowest available charges based on the available charges associated with dialing the selected transmitter device from each digital switch 110. If, however, the call record does identify the telephone number of the receiver device, then file server 200 determines the lowest available charges based on the available charges associated with dialing both the selected transmitter device and the receiver device from each digital switch 110.

5. Data Frame Selection and Data Component Storage

Figure 27:
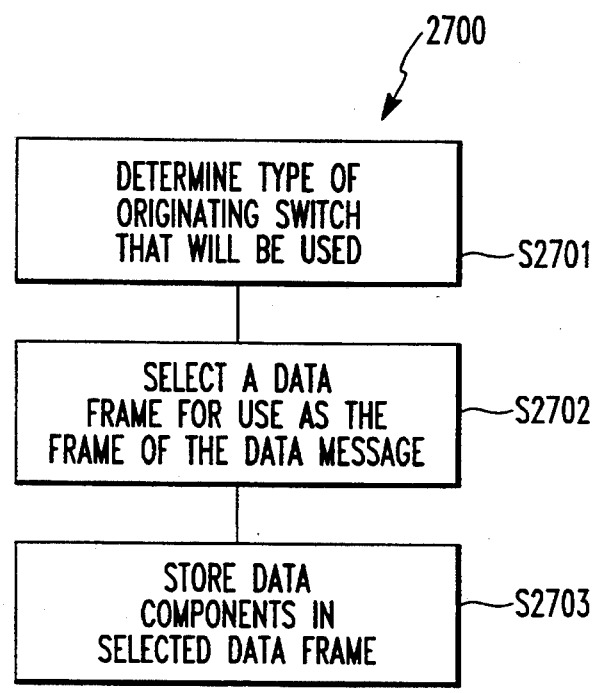
FIG. 27 is a flow chart illustrating a method performed in accordance with one of the steps of the method illustrated in FIG. 15.

FIG. 27 is a flow chart 2700 illustrating the steps performed in selecting a data frame and storing the data components in the selected data frame in accordance with step S1504 of FIG. 15. The steps of FIG. 27 may be performed by CPU 140 (FIG. 13) of file server 200.

As explained above, the data message includes a 144 byte frame of data. The frame of the data message is selected from numerous data frames stored on a hard disk and loaded into RAM 141 (FIG. 13) of file server 200 as called for by a program executed by CPU 140. Each data frame in RAM 141 includes blank portions into which the user call back, coded ringing data, and data port address components of the data message may be written. As explained above, the data message is created by generating the data components of the data message, and then writing or inserting the data components into a selected data frame.

The data frame of the data message is selected based on the contents of the data port address component of the data message. Aside from the blank portions for receiving the data components, each stored data frame includes protocol information required to communicate with the originating switch 110. Different protocol information is required to communicate with different types of digital switches. Thus, the stored data frame which will be used as the data frame of the data message must be capable of communicating with the type of digital switch being used to perform the originating switch function.

With reference to FIG. 27, CPU 140 (FIG. 13) begins the data frame selection process by determining the type of switch that will be used to perform the originating switch function (step S2701). CPU 140 knows which switch 110 will be used as the originating switch based on the contents of the set of information selected for use as the data port address component of the data message.

CPU 140 then selects, for use as the data frame of the data message, one of the data frames stored in RAM 141 (step S2702 of FIG. 27). The selected data frame must be capable of communicating with the digital switch 110 that will be used to perform the originating switch function.

Next, CPU 140 stores the user call back component, the coded ringing data component, and the one of the three sets of information selected for use as the data port address component, in the blank portions of the selected data frame (step S2703). The writing of the three data components into the selected data frame forms a data message comprising a data frame, a user call back component, a coded ringing data component, and a data port address component.

6. Output of the Created Data Message

After the creation and storage of the data message in RAM 141 (FIG. 13), CPU 140 of file server 200 outputs the data message to the originating switch. The originating switch is the digital switch 110 identified by the one of the three sets of information used as the data port address component of the data message. As explained above, the set of information used as the data port address component is the set of information corresponding to the lowest available telecommunications charge.

The originating switch establishes a communications link between the selected transmitter device and the receiver device, the telephone numbers of which may be identified by the user call back data component of the data message. The communications link is established through the trunk ports of the originating switch identified by the data port address component of the data message. In establishing the communications link, the originating switch causes the selected transmitter device to ring (or perform an analogous indication) in accordance with the coded ringing data component of the data message.

V. CONCLUSION

The present invention provides a telecommunications system capable of providing the lowest available telecommunications charge to a user. As a result, users of the telecommunications system of the present invention are able to significantly reduce the costs typically incurred when placing long distance and international calls.

It will be apparent to those skilled in the art that various modifications and variations can be made in the telecommunications system method and apparatus without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-controlled telecommunications system for establishing a communications link between a transmitter device and a receiver device, the system comprising:

a plurality of switch means each for establishing, in response to a switch control signal, a different communications link between the transmitter device and the receiver device by originating a call from that switch means to the transmitter device and by originating a call from that switch means to the receiver device, each of the communications links being associated with a charge imposed by a telecommunications carrier, and each of the switch means being located in a different telecommunications charge zone; and switch control means, coupled to the plurality of switch means, for determining which of the charges for the communications links is lowest at a selected time, and for generating and outputting the switch control signal to a selected one of the switch means to cause that switch means to originate a call from the selected switch means to the transmitter device and to originate a call from the selected switch means to the receiver device in order to establish the one of the communications links corresponding to the lowest determined charge.

2. The computer-controlled telecommunications system according to claim 1, wherein the switch control means comprises:

a memory having a table storing data representing charges corresponding to the communications links for at least one time;

processing means, coupled to the memory, for finding the minimum of the stored charges for the selected time; and control signal building means, coupled to the memory and the processing means, for constructing the switch control signal.

3. The computer-controlled telecommunications system according to claim 2, wherein the control signal building means comprises:

means for generating a data message as part of the switch control signal, the data message including components that identify the transmitter device and the receiver device.

4. The computer-controlled telecommunications system according to claim 2, wherein the table in the memory contains charges corresponding to the telecommunications charge zones for at least one time.

5. The computer-controlled telecommunications system according to claim 4, wherein the processing means comprises:

means for extracting from the table a charge corresponding to each charge zone at the selected time; and means for determining the minimum of the extracted charges at the selected time.

6. The computer-controlled telecommunications system according to claim 2, wherein an initiating one of the plurality of switch means is coupled to the transmitter device, the initiating switch means including:

means for receiving an access signal generated by the transmitter device;

means for generating a call record in response to the access signal, the call record including a transmitter component identifying the transmitter device and a receiver component identifying the receiver device; and means for sending the call record to the switch control means.

7. The computer-controlled telecommunications system according to claim 6, wherein the switch control means further comprises:
means for generating the switch control signal in response to the call record.

8. The computer-controlled telecommunications system according to claim 7, wherein the selected switch means is located in the charge zone corresponding to the lowest charge at the selected time and comprises:
means, responsive to the control signal, for initiating a transmitter communications path between the selected switch means and the transmitter device, and thereafter initiating a receiver communications path between the selected switch means and the receiver device.

9. A switch control device for use in a computer-controlled telecommunications system that establishes a communications link between a transmitter device and a receiver device, the telecommunications system comprising a plurality of switches each for establishing, in response to a switch control signal, a different communications link between the transmitter device and the receiver device by originating a call from that switch to the transmitter device and by originating a call from that switch to the receiver device, each of the communications links being associated with a charge imposed by a telecommunications carrier, each of the switches being located in a different telecommunications charge zone, and the switch control device comprising:
a memory having a table storing data representing charges corresponding to the communications links for at least one time;
processing means, coupled to the memory, for finding the stored charges for a selected time and determining the minimum of the stored charges found; and
control signal building means, coupled to the memory and the processing means, for constructing and outputting the switch control signal to a selected one of the switches to cause the selected switch to originate a call from the selected switch to the transmitter device and to originate a call from the selected switch to the receiver device in order to establish the one of the communications links corresponding to the lowest determined charge.

10. The switch control device according to claim 9, wherein the control signal building means comprises:
means for generating a data message as part of the switch control signal, the data message including components that identify the transmitter device and the receiver device.

11. The switch control device according to claim 9, wherein the table in the memory contains charges corresponding to the telecommunications charge zones for at least one time.

12. The switch control device according to claim 11, wherein the processing means comprises:
means for extracting from the table a charge corresponding to each charge zone at the selected time; and
means for determining the minimum of the extracted charges at the selected time.

13. The switch control device according to claim 9, wherein an initiating one of the plurality of switches is coupled to the transmitter device, the initiating switch including a device for receiving an access signal generated by the transmitter device, a device for generating a call record in response to the access signal, the call record including a transmitter component identifying the transmitter device and a receiver component identifying the receiver device, and a device for sending the call record to the switch control device, and wherein the switch control device comprises:
means for generating the switch control signal in response to the call record.

14. The switch control device according to claim 13, wherein the selected switch is located in the charge zone corresponding to the lowest charge at the selected time and includes a device, responsive to the switch control signal, for initiating a transmitter communications path between that switch and the transmitter device, and thereafter initiating a receiver communications path between that switch and the receiver device, and wherein the switch control device comprises:
means for sending the switch control signal for application to the selected switch to cause that switch to initiate the transmitter and receiver communications paths.

15. A method of establishing a communications link between a transmitter device and a receiver device, the method being performed by a computer-controlled telecommunications system comprising a switch control device and a plurality of switches each for establishing, in response to a switch control signal, a different communications link between the transmitter device and the receiver device by originating a call from that switch to the transmitter device and by originating a call from that switch to the receiver device, each of the communications links being associated with a charge imposed by a telecommunications carrier, and each of the switches being located in a different telecommunications charge zone, the method comprising the steps of:
determining which of the charges for the communications links is lowest at a selected time; and
generating and outputting the switch control signal to a selected one of the switches to cause that switch to originate a call from the selected switch to the transmitter device and to originate a call from the selected switch to the receiver device in order to establish the one of the communications links corresponding to the lowest determined charge.

16. The method according to claim 15, wherein the switch control device comprises a memory having a table storing data representing charges corresponding to the communications links for at least one time, and wherein the step of determining which of the charges for the communications links is lowest comprises:
searching the memory to find the stored charges for the selected time; and
determining the minimum of the stored charges found.

17. The method according to claim 16, wherein the step of generating and outputting the switch control signal comprises the step of:
generating a data message as part of the switch control signal, the data message including components that identify the transmitter device and the receiver device.

18. The method according to claim 16, wherein the table in the memory contains charges corresponding to the telecommunications charge zones for at least one time, and wherein the step of determining which of the charges for the communications links is lowest at the selected time comprises:

extracting from the table, in response to a determination of the selected time, a charge corresponding to each charge zone at the selected time; and determining the minimum of the extracted charges at the selected time.

19. The method according to claim 15, wherein an initiating one of the plurality of switches is coupled to the transmitter device, and the method further comprises the steps, performed by the initiating switch, of:

receiving an access signal generated by the transmitter device;

generating a call record in response to the access signal, the call record including a component identifying the transmitter device, and a component identifying the receiver device; and sending the call record to the switch control device.

20. The method according to claim 19, wherein the step of generating and outputting the switch control signal comprises:

generating the switch control signal in response to the call record.

21. The method according to claim 20, wherein the selected switch is located in the charge zone corresponding to the lowest charge at the selected time, and the establishment of the communications link corresponding to the lowest determined charge comprises:

initiating a transmitter communications path between the selected switch and the transmitter device, and thereafter initiating a receiver communications path between the selected switch and the receiver device.

22. A computer-controlled telecommunications system for establishing communication between a first party and a second party, the system comprising:

a plurality of switches, each of the switches being located in a different telecommunications charge zone, and each of the telecommunications charge zones having a charge associated with a particular call; and a switch control device, coupled to the plurality of switches, for determining which of the charges is lowest at a selected time, and for generating and outputting a switch control command to cause the switch in the telecommunications charge zone having the lowest charge at the selected time to originate a call from that switch to the first party and to originate a call from that switch to the second party in order to establish a communications path between the first party and the second party.

23. The computer-controlled telecommunications system according to claim 22, wherein the switch establishing the communications path between the first party and the second party is located in a telecommunications charge zone different than a telecommunications charge zone in which the first party is located and different than a telecommunications charge zone in which the second party is located.

24. The computer-controlled telecommunications system according to claim 22, wherein the switch in the telecommunications charge zone having the lowest charge at the selected time comprises means for placing a call to the first party and for placing a call to the second party in response to receipt of the switch control command from the switch control device.

25. The computer-controlled telecommunications system according to claim 24, including interface means for accessing a publicly available switched network, and means for placing the call to the first party and the call to the second party over the publicly available switched network.

26. The computer-controlled telecommunications system according to claim 22, including means for transmitting voice signals on the communications path between the first party and the second party.

27. The computer-controlled telecommunications system according to claim 22, including means for transmitting facsimile signals on the communications path between the first party and the second party.

28. The computer-controlled telecommunications system according to claim 22, including means for transmitting asynchronous data on the communications path between the first party and the second party.

29. A method of establishing communication between a first party and a second party, the method being performed by a computer-controlled telecommunications system comprising a plurality of switches, each of the switches being located in a different telecommunications charge zone, and each of the telecommunications charge zones having a charge associated with a particular call, the method comprising the steps of:

determining which of the charges is lowest at a selected time; and generating and outputting a switch control command to cause the switch in the telecommunications charge zone having the lowest charge at the selected time to originate a call from that switch to the first party and to originate a call from that switch to the second party in order to establish a communications path between the first party and the second party.

30. The method according to claim 29, wherein the switch establishing the communications path between the first party and the second party is located in a telecommunications charge zone different than a telecommunications charge zone in which the first party is located and different than a telecommunications charge zone in which the second party is located, and the step of generating and outputting the switch control command comprises generating and outputting the switch control command to the switch establishing the communications path.

31. The method according to claim 29, wherein the step of establishing a communications path between the first and second parties comprises:

placing a first call to the first party from the switch in the telecommunications charge zone having the lowest charge at the selected time; and placing a second call to the second party from the switch in the telecommunications charge zone having the lowest charge at the selected time.

32. The method according to claim 29, wherein the step of establishing a communications path between the first and second parties comprises:

placing a first call to the first party from the switch in the telecommunications charge zone having the lowest charge at the selected time over a publicly available switched network; and placing a second call to the second party from the switch in the telecommunications charge zone having the lowest charge at the selected time over the publicly available switched network.

33. The method according to claim 29, including the step of transmitting voice signals on the communications path between the first party and the second party.

34. The method according to claim 29, including the step of transmitting facsimile signals on the communications path between the first party and the second party.

35. The method according to claim 29, including the step of transmitting asynchronous data on the communications path between the first party and the second party.

36. A computer-controlled telecommunications system for establishing communication between a first party and a second party, the system comprising:
- a plurality of switches, each of the switches being located in a different telecommunications charge zone, and each of the telecommunications charge zones having a charge associated with a particular call; and
- a switch control device, coupled to the plurality of switches, for determining which of the charges is lowest at a selected time, and for generating and outputting a switch control command to cause the switch in the telecommunications charge zone having the lowest charge at the selected time to place a call to the first party and to place a call to the second party, thereby establishing a communications path between the first party and the second party.

37. The computer-controlled telecommunications system according to claim 36, wherein the first party, the second party, and the switch establishing the communications path between the first party and the second party, are each located in a different telecommunications charge zone.

38. The computer-controlled telecommunications system according to claim 36, wherein the switch control device is located outside a telecommunications charge zone in which the switch establishing the communications path between the first party and the second party is located.

39. The computer-controlled telecommunications system according to claim 36, including means for transmitting voice signals on the communications path between the first party and the second party.

40. The computer-controlled telecommunications system according to claim 36, including means for transmitting facsimile signals on the communications path between the first party and the second party.

41. The computer-controlled telecommunications system according to claim 36, including means for transmitting asynchronous data on the communications path between the first party and the second party.

42. A computer-controlled telecommunications system comprising:
- a first telecommunications device co-located with a first party in a first telecommunications charge zone;
- a second telecommunications device co-located with a second party in a second telecommunications charge zone different than that of the first telecommunications device;
- a plurality of switches each located in a different telecommunications charge zone served by at least one telecommunications carrier point of presence allowing each switch served by the point of presence to place calls from the switch through a telecommunications carrier associated with the point of presence; and
- a switch control device for generating and outputting a switch control command to a selected one of the switches to cause the selected switch to establish a communications path between the first and second parties through a telecommunications carrier associated with the point of presence for the selected switch regardless of whether the telecommunications carrier establishing the communications path has a point of presence in the first telecommunications charge zone or the second telecommunications charge zone.

43. The computer-controlled telecommunications system according to claim 42, including means for transmitting voice signals on the communications path between the first party and the second party.

44. The computer-controlled telecommunications system according to claim 42, including means for transmitting facsimile signals on the communications path between the first party and the second party.

45. The computer-controlled telecommunications system according to claim 42, including means for transmitting asynchronous data on the communications path between the first party and the second party.

46. A computer-controlled telecommunications system comprising:
- a plurality of switches, each of the switches being located in a different telecommunications charge zone and each of the telecommunications charge zones having a charge associated with a particular call; and
- a central computer, coupled to the plurality of switches, including means for determining which of the charges is lowest at a selected time, and for generating and outputting a switch control command to cause the switch in the telecommunications charge zone having the lowest charge at the selected time to place a call to a first party and a second party.

47. The computer-controlled telecommunications system according to claim 46, wherein the central computer includes means for causing the switch in the telecommunications charge zone having the lowest charge at the selected time to place a call to the first party and to place a call to the second party in order to establish a communications path between the first and second parties.

48. The computer-controlled telecommunications system according to claim 47, including means for transmitting voice signals on the communications path between the first party and the second party.

49. The computer-controlled telecommunications system according to claim 47, including means for transmitting facsimile signals on the communications path between the first party and the second party.

50. The computer-controlled telecommunications system according to claim 47, including means for transmitting asynchronous data on the communications path between the first party and the second party.

51. A computer-controlled telecommunications system for establishing communication between a first party and a second party, the system comprising:
- a plurality of switches, each of the switches being located in a different telecommunications charge zone, and each of the telecommunications charge zones having a charge associated with a particular call;
- a centrally-located database including a memory having a table storing data representing charges corresponding to the particular calls of the telecommunications charge zones; and a centrally-located computer for determining which of the charges represented by the data stored in the table of the memory is lowest at a selected time and for generating and outputting a switch control command to cause the switch in the telecommunications charge zone having the lowest charge at the selected time to establish a communications path between the first party and the second party.

52. The computer-controlled telecommunications system according to claim 51, wherein the centrally-located computer establishes the communications path between the first party and the second party by originating a call from the switch in the telecommunications charge zone having the lowest charge at the selected time to the first party and by originating a call from that switch to the second party.

53. A computer-controlled telecommunications system for establishing communication between a first party located in a first telecommunications charge zone and a second party located in a second telecommunications charge zone different than the first telecommunications charge zone, the system comprising:
  a plurality of switches, each of the switches being located in a different telecommunications charge zone, with at least one of the switches being located in a telecommunications charge zone other than the first and second telecommunications charge zones, and each of the telecommunications charge zones having a charge associated with a particular call; and
  a switch control device for determining which of the charges is lowest at a selected time, and for generating and outputting a switch control command to cause the switch in the telecommunications charge zone having the lowest charge at the selected time to establish a communications path between the first party and the second party.

54. The computer-controlled telecommunications system according to claim 53, wherein the plurality of switches are located in telecommunications charge zones dispersed worldwide, and the switch control device includes means for determining which telecommunications charge zone charge is lowest in the world at the selected time, and for generating and outputting the switch control command to cause the switch in the telecommunications charge zone having the lowest charge in the world at the selected time to establish the communications path between the first party and second party.

55. The computer-controlled telecommunications system according to claim 53, wherein each of the switches comprises host interface link means for receiving the switch control command output by the switch control device.

56. The computer-controlled telecommunications system according to claim 55, wherein the host interface link means includes means for transmitting at least one control signal to the switch control device.

57. A method of establishing communication between a first party located in a first telecommunications charge zone and a second party located in a second telecommunications charge zone different than the first telecommunications charge zone, the method being performed by a computer-controlled telecommunications system comprising a plurality of switches, each of the switches being located in a different telecommunications charge zone, with at least one of the switches being located in a telecommunications charge zone other than the first and second telecommunications charge zones, and each of the telecommunications charge zones having a charge associated with a particular call, the method comprising the steps of:
  determining which of the charges is lowest at a selected time; and
  generating and outputting a switch control command to cause the switch in the telecommunications charge zone having the lowest charge at the selected time to establish a communications path between the first party and the second party.

58. The method according to claim 57, wherein the establishing of the communications path between the first party and the second party comprises:
  originating a first call to the first party from the switch in the telecommunications charge zone having the lowest charge at the selected time; and
  originating a second call to the second party from the switch in the telecommunications charge zone having the lowest charge at the selected time.

59. The method according to claim 57, including the step of transmitting voice signals on the communications path between the first party and the second party.

60. The method according to claim 57, including the step of transmitting facsimile signals on the communications path between the first party and the second party.

61. The method according to claim 57, including the step of transmitting asynchronous data on the communications path between the first party and the second party.

62. A method of establishing communication between a first party located in a first telecommunications charge zone and a second party located in a second telecommunications charge zone different than the first telecommunications charge zone, the method being performed by a computer-controlled telecommunications system comprising a plurality of switches, each of the switches being located in a different telecommunications charge zone, each of the telecommunications charge zones having time-based charges associated with establishing a communications path between the first and second parties, and the system also comprising a centrally-located database including a memory having a table storing data representing the time-based charges of the telecommunications charge zones, the method comprising the steps of:
  accessing the centrally-located database to identify a third telecommunications charge zone having a lowest charge associated with establishing the communications path between the first and second parties at a selected time; and
  generating and outputting a switch control command to cause the switch in the third telecommunications charge zone to establish the communications path between the first party and the second party.

63. The method according to claim 62, wherein the establishing of the communications path between the first party and the second party comprises:
  originating a first call to the first party from the switch in the telecommunications charge zone having the lowest charge at the selected time; and
  originating a second call to the second party from the switch in the telecommunications charge zone having the lowest charge at the selected time.

64. A method of establishing communication between a first party located in a first telecommunications charge zone and a second party located in a second telecommunications charge zone different than the first telecommumunications charge zone, the method being performed by a computer-controlled telecommunications system comprising a plurality of switches, each of the switches being located in a different telecommunications charge zone, and each of the telecommunications charge zones having charges associated with calls to the first and second parties, the method comprising the steps of:

determining at a selected time a third one of the telecommunications charge zones other than the first and second telecommunications charge zones having a low combined charge associated with calls to the first and second parties; and generating and outputting a switch control command at the selected time to cause the switch in the third telecommunications charge zone to establish a communications path accommodating a call between the first party and the second party.

65. The method according to claim 64, wherein the third telecommunications charge zone has the lowest combined charge available at the selected time.

66. The method according to claim 64, wherein the establishing of the communications path between the first party and the second party comprises:

originating a first call to the first party from the switch in the third telecommunications charge zone at the selected time; and originating a second call to the second party from the switch in the third telecommunications charge zone at the selected time.

* * * * *